United States Patent
Spindel et al.

(10) Patent No.: US 10,692,088 B1
(45) Date of Patent: Jun. 23, 2020

(54) PERFORMING ACTIONS BASED ON THE LOCATION OF A MOBILE DEVICE DURING A CARD SWIPE

(71) Applicant: Square, Inc., San Francisco, CA (US)

(72) Inventors: Nathan Spindel, San Francisco, CA (US); Shawn Morel, San Francisco, CA (US); Nefaur Rahman Khandker, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 16/251,188

(22) Filed: Jan. 18, 2019

Related U.S. Application Data

(63) Continuation of application No. 14/182,655, filed on Feb. 18, 2014, now Pat. No. 10,198,731.

(51) Int. Cl.
  *G06Q 20/40* (2012.01)
  *G06Q 20/34* (2012.01)
  *G06Q 20/20* (2012.01)

(52) U.S. Cl.
  CPC ........ *G06Q 20/4016* (2013.01); *G06Q 20/204* (2013.01); *G06Q 20/34* (2013.01)

(58) Field of Classification Search
  CPC ........ G06Q 20/40; G06Q 20/00; G06Q 30/00; G06Q 30/025; G06Q 20/32; H04W 24/00
  USPC .............................. 705/14.51, 44; 455/456.2
  See application file for complete search history.

(56) References Cited

U.S. PATENT DOCUMENTS

| | | |
|---|---|---|
| 3,854,036 A | 12/1974 | Gupta et al. |
| 4,035,614 A | 7/1977 | Frattarola et al. |
| 4,254,441 A | 3/1981 | Fisher |
| 4,591,937 A | 5/1986 | Nakarai et al. |
| 4,788,420 A | 11/1988 | Chang et al. |

(Continued)

FOREIGN PATENT DOCUMENTS

| | | |
|---|---|---|
| CA | 2 841 267 A1 | 1/2013 |
| JP | 2001-313714 A | 11/2001 |

(Continued)

OTHER PUBLICATIONS

"2.5mm Headset Jack," Retrieved from the Internet URL: http://www.phonescoop.com/glossary/term.php?gid=360, on May 5, 2011, pp. 1-1.

(Continued)

*Primary Examiner* — Olusegun Goyea

(74) *Attorney, Agent, or Firm* — Mattingly & Malur, PC

(57) ABSTRACT

In some examples, a computer system may receive transaction information for transactions between card users and a payee that may include transaction card information from a plurality of read events of a plurality of transaction cards at the payee's card reader. In association with the plurality of read events, the system may receive location information of a plurality of mobile devices, each mobile device being associated respectively with one of the plurality of transaction cards in a data structure maintained by the computer system. For instance, the location information for each mobile device may be indicative of a location of the mobile device at a time of a corresponding read event of an associated transaction card. The system may determine an approximate location of the card reader based on the location information of the plurality of mobile devices.

16 Claims, 9 Drawing Sheets

(56) References Cited

U.S. PATENT DOCUMENTS

| | | |
|---|---|---|
| 4,845,740 A | 7/1989 | Tokuyama et al. |
| 5,173,597 A | 12/1992 | Anglin |
| 5,266,789 A | 11/1993 | Anglin et al. |
| 5,434,400 A | 7/1995 | Scherzer |
| 5,463,678 A | 10/1995 | Kepley, III et al. |
| 5,589,855 A | 12/1996 | Blumstein et al. |
| 5,652,421 A | 7/1997 | Veeneman et al. |
| 5,679,943 A | 10/1997 | Schultz et al. |
| 5,764,742 A | 6/1998 | Howard et al. |
| 5,850,599 A | 12/1998 | Seiderman |
| 5,878,337 A | 3/1999 | Joao et al. |
| 5,945,654 A | 8/1999 | Huang |
| 5,991,749 A | 11/1999 | Morrill, Jr. |
| 6,006,109 A | 12/1999 | Shin |
| 6,021,944 A | 2/2000 | Arakaki |
| 6,032,859 A | 3/2000 | Muehlberger et al. |
| 6,061,666 A | 5/2000 | Do et al. |
| 6,129,277 A | 10/2000 | Grant et al. |
| 6,234,389 B1 | 5/2001 | Valliani et al. |
| 6,330,544 B1 | 12/2001 | Walker et al. |
| 6,341,353 B1 | 1/2002 | Herman et al. |
| 6,363,139 B1 | 3/2002 | Zurek et al. |
| 6,400,517 B1 | 6/2002 | Murao |
| 6,431,445 B1 | 8/2002 | DeLand et al. |
| 6,476,743 B1 | 11/2002 | Brown et al. |
| 6,481,623 B1 | 11/2002 | Grant et al. |
| 6,536,670 B1 | 3/2003 | Postman et al. |
| 6,579,728 B2 | 6/2003 | Grant et al. |
| 6,612,488 B2 | 9/2003 | Suzuki |
| 6,813,608 B1 | 11/2004 | Baranowski |
| 6,832,721 B2 | 12/2004 | Fujii |
| 6,850,147 B2 | 2/2005 | Prokoski et al. |
| 6,868,391 B1 | 3/2005 | Hultgren |
| 6,896,182 B2 | 5/2005 | Sakaguchi |
| 6,898,598 B2 | 5/2005 | Himmel et al. |
| 6,944,782 B2 | 9/2005 | von Mueller et al. |
| 7,003,316 B1 | 2/2006 | Elias et al. |
| 7,013,149 B2 | 3/2006 | Vetro et al. |
| 7,149,296 B2 | 12/2006 | Brown et al. |
| 7,167,711 B1 | 1/2007 | Dennis |
| 7,252,232 B2 | 8/2007 | Fernandes et al. |
| 7,309,012 B2 | 12/2007 | von Mueller et al. |
| 7,324,836 B2 | 1/2008 | Steenstra et al. |
| 7,363,054 B2 | 4/2008 | Elias et al. |
| 7,376,431 B2 | 5/2008 | Niedermeyer |
| 7,409,234 B2 | 8/2008 | Glezerman |
| 7,433,452 B2 | 10/2008 | Taylor et al. |
| 7,493,390 B2 | 2/2009 | Bobde et al. |
| 7,506,812 B2 | 3/2009 | von Mueller et al. |
| 7,520,430 B1 | 4/2009 | Stewart et al. |
| 7,575,166 B2 | 8/2009 | McNamara |
| 7,581,678 B2 | 9/2009 | Narendra et al. |
| 7,600,673 B2 | 10/2009 | Stoutenburg et al. |
| 7,703,676 B2 | 4/2010 | Hart et al. |
| 7,707,089 B1 | 4/2010 | Barton et al. |
| 7,708,189 B1 | 5/2010 | Cipriano |
| 7,752,135 B2 | 7/2010 | Brown et al. |
| 7,757,953 B2 | 7/2010 | Hart et al. |
| 7,764,185 B1 | 7/2010 | Manz et al. |
| 7,793,834 B2 | 9/2010 | Hachey et al. |
| 7,810,729 B2 | 10/2010 | Morley |
| 7,869,591 B1 | 1/2011 | Nagel et al. |
| 7,896,248 B2 | 3/2011 | Morley |
| 7,918,394 B1 | 4/2011 | Morley, Jr. |
| 8,011,587 B2 | 9/2011 | Johnson et al. |
| 8,112,066 B2 | 2/2012 | Ben Ayed |
| 8,231,055 B2 | 7/2012 | Wen |
| 8,266,551 B2 | 9/2012 | Boldyrev et al. |
| 8,336,771 B2 | 12/2012 | Tsai et al. |
| 8,376,239 B1 | 2/2013 | Humphrey |
| 8,413,901 B2 | 4/2013 | Wen |
| 8,500,010 B1 | 8/2013 | Marcus et al. |
| 8,560,823 B1 | 10/2013 | Aytek et al. |
| 8,571,989 B2 | 10/2013 | Dorsey et al. |
| 8,573,487 B2 | 11/2013 | McKelvey |
| 8,573,489 B2 | 11/2013 | Dorsey et al. |
| 8,584,946 B2 | 11/2013 | Morley |
| 8,602,305 B2 | 12/2013 | Dorsey et al. |
| 8,612,352 B2 | 12/2013 | Dorsey et al. |
| 8,615,445 B2 | 12/2013 | Dorsey et al. |
| 8,630,586 B2 | 1/2014 | Dvortsov et al. |
| 8,635,117 B1 | 1/2014 | Acuna-Rohter |
| 8,640,953 B2 | 2/2014 | Dorsey et al. |
| 8,676,119 B2 | 3/2014 | Cohen et al. |
| 8,678,277 B2 | 3/2014 | Dorsey et al. |
| 8,701,996 B2 | 4/2014 | Dorsey et al. |
| 8,701,997 B2 | 4/2014 | Dorsey et al. |
| 8,763,900 B2 | 7/2014 | Marcus et al. |
| 8,794,517 B1 | 8/2014 | Templeton et al. |
| 8,855,312 B1 | 10/2014 | Hodgman et al. |
| 8,859,337 B2 | 10/2014 | Gaul et al. |
| 8,990,121 B1 | 3/2015 | Guise et al. |
| 9,569,767 B1 | 2/2017 | Lewis et al. |
| 9,805,370 B1 | 10/2017 | Quigley et al. |
| 9,911,116 B1 | 3/2018 | Lewis et al. |
| 9,940,616 B1 | 4/2018 | Morgan et al. |
| 10,198,731 B1 | 2/2019 | Spindel et al. |
| 10,504,093 B1 | 12/2019 | Lewis et al. |
| 2002/0002507 A1 | 1/2002 | Hatakeyama |
| 2002/0030871 A1 | 3/2002 | Anderson et al. |
| 2002/0077974 A1 | 6/2002 | Ortiz |
| 2002/0091646 A1 | 7/2002 | Lake et al. |
| 2002/0108062 A1 | 8/2002 | nakajima et al. |
| 2002/0165462 A1 | 11/2002 | Westbrook et al. |
| 2002/0188535 A1 | 12/2002 | Chao et al. |
| 2003/0089772 A1 | 5/2003 | Chien |
| 2003/0132300 A1 | 7/2003 | Dilday et al. |
| 2003/0144040 A1 | 7/2003 | Liu et al. |
| 2003/0204447 A1 | 10/2003 | Dalzell et al. |
| 2004/0012875 A1 | 1/2004 | Wood |
| 2004/0033726 A1 | 2/2004 | Kao |
| 2004/0041911 A1 | 3/2004 | Odagiri et al. |
| 2004/0093496 A1 | 5/2004 | Colnot |
| 2004/0104268 A1 | 6/2004 | Bailey |
| 2004/0127256 A1 | 7/2004 | Goldthwaite et al. |
| 2004/0128256 A1 | 7/2004 | Krouse et al. |
| 2004/0151026 A1 | 8/2004 | Naso et al. |
| 2004/0197489 A1 | 10/2004 | Heuser et al. |
| 2004/0204074 A1 | 10/2004 | Desai |
| 2005/0077870 A1 | 4/2005 | Ha et al. |
| 2005/0156037 A1 | 7/2005 | Wurzburg |
| 2005/0156038 A1 | 7/2005 | Wurzburg et al. |
| 2005/0194452 A1 | 9/2005 | Nordentoft et al. |
| 2005/0242173 A1 | 11/2005 | Suzuki |
| 2006/0000917 A1 | 1/2006 | Kim et al. |
| 2006/0094481 A1 | 5/2006 | Gullickson |
| 2006/0122902 A1 | 6/2006 | Petrov et al. |
| 2006/0152276 A1 | 7/2006 | Barksdale |
| 2006/0208066 A1 | 9/2006 | Finn et al. |
| 2006/0223580 A1 | 10/2006 | Antonio et al. |
| 2006/0234771 A1 | 10/2006 | Shavrov |
| 2006/0271497 A1 | 11/2006 | Cullen et al. |
| 2007/0063048 A1 | 3/2007 | Havens et al. |
| 2007/0067833 A1 | 3/2007 | Colnot |
| 2007/0100651 A1 | 5/2007 | Ramer et al. |
| 2007/0150387 A1 | 6/2007 | Seubert et al. |
| 2007/0155430 A1 | 7/2007 | Cheon et al. |
| 2007/0174080 A1 | 7/2007 | Outwater |
| 2007/0203836 A1 | 8/2007 | Dodin |
| 2007/0208930 A1 | 9/2007 | Blank et al. |
| 2007/0221728 A1 | 9/2007 | Ferro et al. |
| 2007/0244811 A1 | 10/2007 | Tumminaro |
| 2007/0250623 A1 | 10/2007 | Hickey et al. |
| 2007/0255620 A1 | 11/2007 | Tumminaro et al. |
| 2007/0255653 A1 | 11/2007 | Tumminaro et al. |
| 2008/0027815 A1 | 1/2008 | Johnson et al. |
| 2008/0035725 A1 | 2/2008 | Jambunathan et al. |
| 2008/0037442 A1 | 2/2008 | Bill |
| 2008/0040274 A1 | 2/2008 | Uzo |
| 2008/0059370 A1 | 3/2008 | Sada et al. |
| 2008/0059375 A1 | 3/2008 | Abifaker |
| 2008/0177624 A9 | 7/2008 | Dohse |
| 2008/0177662 A1 | 7/2008 | Smith et al. |
| 2008/0197188 A1 | 8/2008 | Jagatic et al. |

(56) References Cited

U.S. PATENT DOCUMENTS

| | | |
|---|---|---|
| 2008/0238610 A1 | 10/2008 | Rosenberg |
| 2008/0249939 A1 | 10/2008 | Veenstra |
| 2008/0296978 A1 | 12/2008 | Finkenzeller et al. |
| 2009/0068982 A1 | 3/2009 | Chen et al. |
| 2009/0094126 A1 | 4/2009 | Killian et al. |
| 2009/0098908 A1 | 4/2009 | Silverbrook et al. |
| 2009/0104920 A1 | 4/2009 | Moon et al. |
| 2009/0117883 A1 | 5/2009 | Coffing et al. |
| 2009/0119190 A1 | 5/2009 | Realini |
| 2009/0159681 A1 | 6/2009 | Mullen et al. |
| 2010/0063893 A1 | 3/2010 | Townsend |
| 2010/0076777 A1 | 3/2010 | Paretti et al. |
| 2010/0184479 A1 | 7/2010 | Griffin |
| 2010/0243732 A1 | 9/2010 | Wallner |
| 2010/0269059 A1 | 10/2010 | Olthmer et al. |
| 2010/0287030 A1 | 11/2010 | Sinha et al. |
| 2010/0332339 A1 | 12/2010 | Patel et al. |
| 2010/0332400 A1 | 12/2010 | Etchegoyen |
| 2011/0053560 A1 | 3/2011 | Jain et al. |
| 2011/0055084 A1 | 3/2011 | Singh |
| 2011/0084131 A1 | 4/2011 | McKelvey |
| 2011/0084139 A1 | 4/2011 | McKelvey et al. |
| 2011/0084147 A1 | 4/2011 | Wilson et al. |
| 2011/0137803 A1 | 6/2011 | Willins |
| 2011/0161235 A1 | 6/2011 | Beenau et al. |
| 2011/0198395 A1 | 8/2011 | Chen |
| 2011/0202463 A1 | 8/2011 | Powell |
| 2011/0251892 A1* | 10/2011 | Laracey ............ G06Q 30/0253 705/14.51 |
| 2011/0258120 A1 | 10/2011 | Weiss |
| 2011/0258689 A1 | 10/2011 | Cohen et al. |
| 2011/0302019 A1 | 12/2011 | Proctor, Jr. et al. |
| 2012/0005039 A1 | 1/2012 | Dorsey et al. |
| 2012/0008851 A1 | 1/2012 | Pennock et al. |
| 2012/0011071 A1 | 1/2012 | Pennock et al. |
| 2012/0012653 A1 | 1/2012 | Johnson et al. |
| 2012/0030116 A1 | 2/2012 | Shirey et al. |
| 2012/0052910 A1 | 3/2012 | Mu et al. |
| 2012/0061467 A1 | 3/2012 | Tang et al. |
| 2012/0084203 A1 | 4/2012 | Mehew et al. |
| 2012/0095869 A1 | 4/2012 | McKelvey |
| 2012/0095871 A1 | 4/2012 | Dorsey et al. |
| 2012/0095906 A1 | 4/2012 | Dorsey et al. |
| 2012/0095907 A1 | 4/2012 | Dorsey et al. |
| 2012/0095916 A1 | 4/2012 | Dorsey et al. |
| 2012/0097739 A1 | 4/2012 | Babu et al. |
| 2012/0110568 A1 | 5/2012 | Abel et al. |
| 2012/0118956 A1 | 5/2012 | Lamba et al. |
| 2012/0118959 A1 | 5/2012 | Sather et al. |
| 2012/0118960 A1 | 5/2012 | Sather et al. |
| 2012/0126005 A1 | 5/2012 | Dorsey et al. |
| 2012/0126006 A1 | 5/2012 | Dorsey et al. |
| 2012/0126007 A1 | 5/2012 | Lamba et al. |
| 2012/0126010 A1 | 5/2012 | Babu et al. |
| 2012/0126011 A1 | 5/2012 | Lamba et al. |
| 2012/0126012 A1 | 5/2012 | Lamba et al. |
| 2012/0126013 A1 | 5/2012 | Sather et al. |
| 2012/0126014 A1 | 5/2012 | Sather et al. |
| 2012/0130903 A1 | 5/2012 | Dorsey et al. |
| 2012/0132712 A1 | 5/2012 | Babu et al. |
| 2012/0138683 A1 | 6/2012 | Sather et al. |
| 2012/0168505 A1 | 7/2012 | Sather et al. |
| 2012/0209773 A1* | 8/2012 | Ranganathan ..... G06Q 20/3224 705/44 |
| 2012/0234918 A1 | 9/2012 | Lindsay |
| 2012/0244885 A1* | 9/2012 | Hefetz ................. G06Q 20/32 455/456.2 |
| 2012/0246074 A1 | 9/2012 | Annamalai et al. |
| 2012/0259651 A1 | 10/2012 | Mallon et al. |
| 2012/0270528 A1 | 10/2012 | Goodman |
| 2012/0278727 A1 | 11/2012 | Ananthakrishnan et al. |
| 2012/0323685 A1 | 12/2012 | Ullah |
| 2012/0330840 A1 | 12/2012 | Stinchcombe |
| 2013/0006773 A1 | 1/2013 | Lutnick et al. |
| 2013/0024341 A1 | 1/2013 | Jeon et al. |
| 2013/0031003 A1 | 1/2013 | Dorsey et al. |
| 2013/0031004 A1 | 1/2013 | Dorsey et al. |
| 2013/0050080 A1 | 2/2013 | Dahl et al. |
| 2013/0065672 A1 | 3/2013 | Gelman et al. |
| 2013/0066783 A1 | 3/2013 | Wolff |
| 2013/0087614 A1 | 4/2013 | Limtao et al. |
| 2013/0103946 A1 | 4/2013 | Binenstock |
| 2013/0124333 A1 | 5/2013 | Doughty et al. |
| 2013/0132140 A1 | 5/2013 | Amin et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0189953 A1 | 7/2013 | Mathews |
| 2013/0200153 A1 | 8/2013 | Dorsey et al. |
| 2013/0207481 A1 | 8/2013 | Gobburu et al. |
| 2013/0225081 A1 | 8/2013 | Doss et al. |
| 2013/0246207 A1 | 9/2013 | Novak et al. |
| 2013/0246301 A1 | 9/2013 | Radhakrishnan et al. |
| 2013/0254117 A1 | 9/2013 | von Mueller et al. |
| 2013/0290522 A1 | 10/2013 | Behm, Jr. |
| 2013/0291018 A1 | 10/2013 | Billings et al. |
| 2014/0001257 A1 | 1/2014 | Dorsey et al. |
| 2014/0001263 A1 | 1/2014 | Babu et al. |
| 2014/0017955 A1 | 1/2014 | Lo et al. |
| 2014/0057667 A1 | 2/2014 | Blankenship et al. |
| 2014/0061301 A1 | 3/2014 | Cho et al. |
| 2014/0076964 A1 | 3/2014 | Morley |
| 2014/0096179 A1 | 4/2014 | Ben-Shalom et al. |
| 2014/0097242 A1 | 4/2014 | McKelvey |
| 2014/0099888 A1 | 4/2014 | Flanagan et al. |
| 2014/0124576 A1 | 5/2014 | Zhou et al. |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0136318 A1 | 5/2014 | Alberth, Jr. et al. |
| 2014/0144983 A1 | 5/2014 | Dorsey et al. |
| 2014/0172700 A1 | 6/2014 | Teuwen et al. |
| 2014/0184505 A1 | 7/2014 | Fullerton et al. |
| 2014/0188639 A1 | 7/2014 | Dinardo, Sr. |
| 2014/0203082 A1 | 7/2014 | Huh |
| 2014/0214670 A1* | 7/2014 | McKenna ........ G06Q 20/40145 705/44 |
| 2014/0254820 A1 | 9/2014 | Gardenfors et al. |
| 2014/0278589 A1 | 9/2014 | Rados et al. |
| 2014/0279518 A1 | 9/2014 | Acuna-Rohter |
| 2014/0379580 A1 | 12/2014 | Varma et al. |
| 2015/0206416 A1 | 7/2015 | Marra et al. |

FOREIGN PATENT DOCUMENTS

| | | |
|---|---|---|
| JP | 2003-108777 A | 4/2003 |
| JP | 2004-078662 A | 3/2004 |
| JP | 2005-269172 A | 9/2005 |
| JP | 2006-139641 A | 6/2006 |
| JP | 2006-179060 A | 7/2006 |
| JP | 2006-308438 A | 11/2006 |
| KR | 10-0452161 B1 | 10/2004 |
| KR | 10-2005-0077659 A | 8/2005 |
| KR | 10-2008-0039330 A | 5/2008 |
| WO | 01/65827 A2 | 9/2001 |
| WO | 02/084548 A | 10/2002 |
| WO | 2010/097711 A2 | 9/2010 |
| WO | 2010/135174 A1 | 11/2010 |

OTHER PUBLICATIONS

"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-aredit-cards-.., on Feb. 8, 2011, pp. 1-3.

Acidus, "Mag-stripe Interfacing—A Lost Art," Retrieved from the Internet URL: http://www.scribd.com/doc/18236182/Magstripe-Interfacing#open_ . . . , on Feb. 7, 2011, pp. 1-4.

"Advancing Payment Security: MasterCard Contactless Security Overview," www.mastercard.com, retrieved from Internet URL: https://www.mastercard.com/contactless/doc/MasterCardContactless_SecurityFactSheet_2015.pdf, on Jun. 12, 2017, pp. 1-4.

(56) References Cited

OTHER PUBLICATIONS

"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-sid . . . , on Apr. 19, 2011, pp. 1-2.

"Arduino magnetic stripe decoder," Instructables, Retrieved from the Internet URL: http://www.instructables.com/id/Arduino-magneticstripe-decorder/, on Feb. 8, 2011, pp. 1-5.

"Barcode scanner and Magnetic Stripe Reader (MSR) for Pocke..," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.

Bauer, G.R. et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.

Bourdeauducq, S., "Reading magnetic cards (almost) for free" ("Lekernel"), Jan. 26, 2009, Retrieved from the Internet URL: http://lekernel.net/blog/?p=12, on May 5, 2011, pp. 1-2.

Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . ., on Feb. 8, 2011, pp. 1-3.

"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.

"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.

"Get paid on the spot from your mobile phone," Retrieved from the Internet URL: http://payments.intuit.com/products/basic-payment-solutions/mobile-credit-card-processin.., on Feb. 11, 2011, pp. 1-3.

Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.

Grandison, K., "vTerminal Credit Card Processing App for AuthorizeNet and PayPal Payflow Pro for Curve 8350 8500 8900 and Bold 9000," Retrieved from the Internet URL: http://www.4blackberry.net/tag/business-tools/vterminal-credit-card-processing-app-for-authorizenet-and-paypal-payflow-pro-for-curve-8350-8500-890-download-2075.html, on Mar. 30, 2015, pp. 1-4.

Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.

"Headphone Jack (3.5mm)," Retrieved from the Internet URL: http://www.phonescoop.com/glossary/term.php?gid=440, on May 5, 2011, pp. 1-1.

Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.

Kuo, Y-S et al., "Hijacking Power and Bandwidth from the Mobile Phone's Audio Interface," Proceedings of the First ACM Symposium on Computing for Development, (DEV'10), Dec. 17, 2010, pp. 1-10.

Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.

"Magnetic Card Reader," lekernel.net~scrapbook, Retrieved from the Internet URL: http://lekernel.net/scrapbook/old/cardreader.html, on Apr. 25, 2011, pp. 1-4.

"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164-fc3 . . . , on Feb. 8, 2011, pp. 1-1.

"Magnetic stripe reader/writer," Retrieved from the Internet URL: http://www.gae.ucm.es/-padilla/extrawork/stripe.html, on Dec. 21, 2009, pp. 1-2.

"Mag-stripe readers The hunt for a homebrew mag-stripe reader that'll work with modem," Jan. 16, 2009, Retrieved from the Internet URL: http://www.hak5.org/forums/index.php?showtopic=11563&st=20, on Apr. 25, 2011, pp. 1-6.

"Mophie Marketplace Magnetic Strip Reader/Case for iPhone 3G & 3GS—Grey," J&R (JR.com), Retrieved from the Internet URL: http://www.jr.com/mophie/pe/MPE_MPIP3GBLK/, on Feb. 8, 2011, pp. 1-1.

"MSR500EX (Mini123EX) Portable Magnetic Stripe Card Reader," TYNER, Apr. 27, 2007, Retrieved from the Internet URL: http://www.tyner.com/magnetic/msr500ex.htm, on Apr. 22, 2011, pp. 1-3.

Munson, J., and Gupta, V.K., "Location-Based Notification as a General-Purpose Service," dated Sep. 28, 2002, Retrieved from the Internet URL—https://ai2-s2-pdfs.s3.amazonaws.com/1 bb5/6ae0a70b030e2f2376ed246834bddcabd27b.pdf, pp. 40-44.

Myres, L., "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.

"Online Shopping," dated Nov. 2, 2014, Retrieved from the Internet URL: http://en.wikipedia.org/wiki/Online_shopping, on Nov. 10, 2014, pp. 1-12.

Padilla, L. "The simplest magnetic stripe reader," Jan. 27, 2003, Retrieved from the Internet URL: www.gae.ucm.esi~padilla/extrawork/soundtrack.html, on Dec. 21, 2009, pp. 1-5.

Padilla, L., "Magnetic stripe reader circuit," Jan. 28, 1997, Retrieved from the Internet URL: http://www.gae.ucm.es/~padilla/extraworklmagamp.html, on May 5, 2011, pp. 1-7.

Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.

"Payment Gateway," Wikipedia, published May 30, 2014, Retrieved from the Internet URL: http://en.wikipedia.org/wiki/Payment gateways, on Jun. 6, 2014, pp. 1-3.

"Pay@PC," Retrieved from the Internet URL: http://www.merchantanywhere.com/PAY_AT_PCT@PC.htm, on Feb. 11, 2011, pp. 1-2.

"Reference Designations for Electrical and Electronics Parts and Equipment, Engineering Drawing and Related Documentation Practices," ASME Y14.44-2008, The American Society of Mechanical Engineers, Nov. 21, 2008, pp. 1-31.

"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.

"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.

Titlow, J.P., "ROAM pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.

"Touch-Pay Wireless Credit Card Processing," MerchantSeek, Retrieved from the Internet URL: http://www.merchantseek.com/wireless-credit-card-processing.htm, on Feb. 11, 2011, pp. 1-5.

"Travel industry targeted for Palm PDA card reader," Retrieved from the Internet URL: http://www.m-travel.com/news/2001/08/travel_industry.html, on Apr. 19, 2011, pp. 1-2.

"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.

"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.

(56) References Cited

OTHER PUBLICATIONS

Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.
"Verified by Visa Acquirer and Merchant Implementation Guide," U.S. Region, Visa Public, May, 2011, pp. 1-114.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
Website: www.alexwinston.com, Aug. 31, 2009, pp. 1-5.
Non-Final Office Action dated Sep. 13, 2006, for U.S. Appl. No. 10/355,557, of Niedermeyer, B.J., filed Jan. 31, 2003.
Final Office Action dated Feb. 9, 2007, for U.S. Appl. No. 10/355,557, of Niedermeyer, B.J., filed Jan. 31, 2003.
Non-Final Office Action dated Apr. 30, 2007, for U.S. Appl. No. 10/355,557, of Niedermeyer, B.J., filed Jan. 31, 2003.
Final Office Action dated Sep. 26, 2007, for U.S. Appl. No. 10/355,557, of Niedermeyer, B.J., filed Jan. 31, 2003.
Notice of Allowance dated Feb. 26, 2008, for U.S. Appl. No. 10/355,557, of Niedermeyer, B.J., filed Jan. 31, 2003.
First Examination Report for Australian Patent Application No. 2012281153, dated Mar. 20, 2015.
Examiner Requisition for Canadian Application No. 2,841,267, dated Jul. 14, 2015.
Non-Final Office Action dated Sep. 11, 2015, for U.S. Appl. No. 14/271,368, of Lewis, J., et al., filed May 6, 2014.
Non-Final Office Action dated Oct. 5, 2015, for U.S. Appl. No. 13/829,658, of Morgan, T.B., et al., filed Mar. 14, 2013.
Second Examination Report for Australian Patent Application No. 2012281153, dated Nov. 13, 2015.
Non-Final Office Action dated Nov. 18, 2015, for U.S. Appl. No. 14/182,655, of Spindel, N., et al., filed Feb. 18, 2014.
Third Examination Report for Australian Patent Application No. 2012281153, dated Jan. 13, 2016.
Non-Final Office Action dated Jan. 20, 2016, for U.S. Appl. No. 14/271,368, of Lewis, J., et al., filed May 6, 2014.
Advisory Action dated Mar. 3, 2017, for U.S. Appl. No. 15/087,581, of Quigley, O.S.C., et al., filed Mar. 31, 2016.
Notice of Acceptance for Australian Patent Application No. 2012281153, dated Apr. 1, 2016.
Final Office Action dated Apr. 27, 2016, for U.S. Appl. No. 14/182,655, of Spindel, N., et al., filed Feb. 18, 2014.
Final Office Action dated Jun. 20, 2016, for U.S. Appl. No. 13/829,658, of Morgan, T.B., et al., filed Mar. 14, 2013.
Non-Final Office Action dated Jul. 5, 2016, for U.S. Appl. No. 14/271,350, of Lewis, J., et al., filed May 6, 2014.
Non-Final Office Action dated Jul. 8, 2016, in U.S. Appl. No. 15/087,581, of Quigley, O.S.C., et al., filed Mar. 31, 2016.
Final Office Action dated Jul. 29, 2016, for U.S. Appl. No. 14/271,368, of Lewis, J., et al., filed May 6, 2014.
Non-Final Office Action dated Sep. 8, 2016, for U.S. Appl. No. 14/312,371, of Varma, A.K., et al., filed Jun. 23, 2014.
Advisory Action dated Sep. 21, 2016, for U.S. Appl. No. 13/829,658, of Morgan, T.B., et al., filed Mar. 14, 2013.
Non-Final Office Action dated Sep. 22, 2016, for U.S. Appl. No. 14/182,655, of Spindel, N., et al., filed Feb. 18, 2014.
Notice of Allowance for Canadian Patent Application No. 2,841,267, dated Oct. 13, 2016.
Notice of Allowance dated Oct. 13, 2016, for U.S. Appl. No. 14/271,368, of Lewis, J., et al., filed May 6, 2014.
Final Office Action dated Dec. 23, 2016, for U.S. Appl. No. 15/087,581, of Quigley, O.S.C., et al., filed Mar. 31, 2016.
Final Office Action dated Jan. 18, 2017, for U.S. Appl. No. 14/271,350, of Lewis, J., et al., filed May 6, 2014.
Non-Final Office Action dated Mar. 15, 2017, for U.S. Appl. No. 13/829,658, of Morgan, T.B., et al., filed Mar. 14, 2013.
Office Action for European Patent Application No. 12736048.5, dated Apr. 3, 2017.
Final Office Action dated Apr. 27, 2017, for U.S. Appl. No. 14/312,371, of Varma, A.K., et al., filed Jun. 23, 2014.
Notice of Allowance dated Jun. 26, 2017, for U.S. Appl. No. 15/087,581, of Quigley, O.S.C., et al., filed Mar. 31, 2016.
Advisory Action dated Jul. 11, 2017, for U.S. Appl. No. 14/312,371, of Varma, A.K., et al., filed Jun. 23, 2014.
Final Office Action dated Sep. 15, 2017, for U.S. Appl. No. 14/182,655, of Spindel, N., et al., filed Feb. 18, 2014.
Notice of Allowance dated Oct. 26, 2017, for U.S. Appl. No. 14/271,350, of Lewis, J., et al., filed May 6, 2014.
Notice of Allowance dated Nov. 24, 2017, for U.S. Appl. No. 13/829,658, of Morgan, T.B., et al., filed Mar. 14, 2013.
Non-Final Office Action dated Mar. 21, 2018, for U.S. Appl. No. 14/182,655, of Spindel, N., et al., filed Feb. 18, 2014.
Non-Final Office Action dated Jul. 12, 2018, for U.S. Appl. No. 14/312,371, of Varma, A.K., et al., filed Jun. 23, 2014.
Summons to Oral Proceedings for European Patent Application No. 12736048.5, dated Jul. 25, 2018.
Notice of Allowance dated Sep. 21, 2018, for U.S. Appl. No. 14/182,655, of Spindel, N., et al., filed Feb. 18, 2014.
Non-Final Office Action dated Sep. 21, 2018, for U.S. Appl. No. 15/393,685, of Lewis, J., et al., filed Dec. 29, 2016.
Final Office Action dated Feb. 8, 2019, for U.S. Appl. No. 14/312371, of Varma A.K., et al., filed Jun. 23, 2014.
Final Office Action dated May 2, 2019, for U.S. Appl. No. 15/393,685, of Lewis, J., et al., filed Dec. 29, 2016.
Notice of Allowance dated Jul. 31, 2019, for U.S. Appl. No. 15/393,685, of Lewis, J., et al., filed Dec. 29, 2016.
Non-Final Office Action dated Dec. 13, 2007, for U.S. Appl. No. 10/355,557, of Niedermeyer, B.J., filed Jan. 31, 2003.

\* cited by examiner

PERFORMING ACTIONS BASED ON THE LOCATION OF A MOBILE DEVICE DURING A CARD SWIPE

CROSS-REFERENCE TO RELATED APPLICATION

This application is a continuation of, and claims priority to, U.S. patent application Ser. No. 14/182,655, filed Feb. 18, 2014, which is incorporated by reference herein.

BACKGROUND

Payment card (e.g., credit card, debit card) fraud is a significant concern for many parties, including banks that issue payment cards, merchants that accept payment cards, and customers that obtain and use payment cards to pay for purchases and other financial transactions. Criminals are able to counterfeit a payment card given the right information, and the information is often not difficult for the thieves to obtain. News media reports of thousands, and even millions, of payment cards being stolen from companies by criminals that are able to break into the companies' computer networks are alarmingly common. The criminals can counterfeit a payment card using this stolen payment card information, or can simply sell the payment card information to other criminals who will counterfeit the payment card. Payment card information can be stolen as simply as by a waiter or waitress at a restaurant swiping a customer's payment card through a personal card reader the size of an ice cube after the customer provides the payment card to pay for a meal. Criminals can use this information to counterfeit a payment card, and can use the payment card to make a fraudulent purchase or to pay for a fraudulent financial transaction.

BRIEF DESCRIPTION OF THE DRAWINGS

Embodiments of the present invention will be described and explained through the use of the accompanying drawings in which.

DETAILED DESCRIPTION

Figure 1:
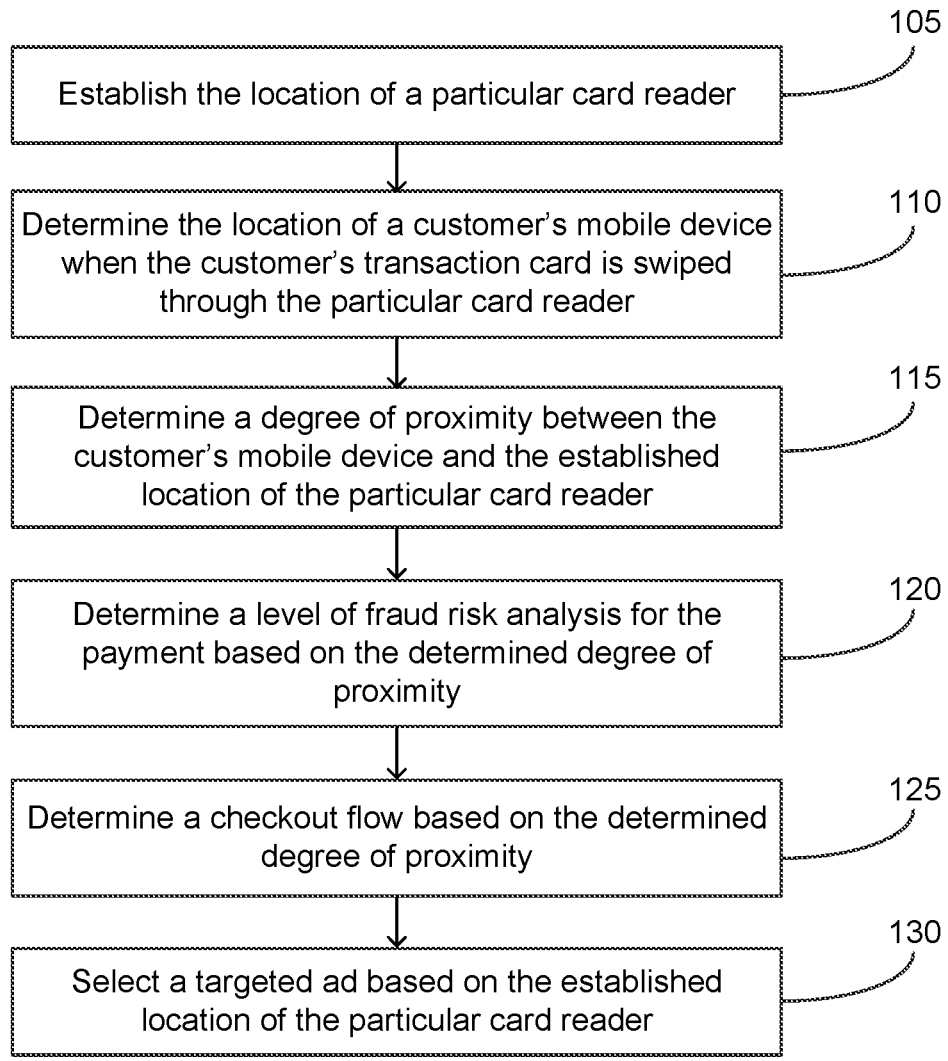
FIG. 1 is a high-level flow diagram of operations that can be performed by a computer system based on an established location of a card reader.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is a technique related to basing actions on a location of a mobile device during a card swipe of a payment object, such as a credit card or a debit card. When a customer's mobile device is located near the location of a card swipe or at the same place of business as where the card swipe occurs, there is a high likelihood that the customer is involved in the card swipe, and a corresponding low likelihood that the card swipe is associated with a fraudulent transaction. Conversely, when the customer's mobile device is located at a different location than a card swipe, there is an increased likelihood that the customer is not involved in the card swipe and a corresponding increased likelihood that the purchase transaction is fraudulent. Therefore, for example, an action such as a fraud screening process can be based on the location of the customer's mobile device at the time of a swipe of a payment card belonging to the customer.

The term "swipe" here refers to any manner of triggering a card reader to read a card, such as passing a card through a magnetic stripe reader, smartcard reader, optical code reader, radio frequency identification (RFID) reader, etc. A payment card is one type of payment object. The term "payment object" here refers to any object that can be used to make an electronic payment, such as a mobile device via a digital wallet application, an object containing an optical code such as a quick response (QR) code, etc. The term "card reader" here refers to any object that can be used to obtain information from an object used to make an electronic payment where the card reader must be in the general vicinity of the object, such as an optical scanner, a near field communications device, a Bluetooth communications device, etc. The term "cause" and variations thereof, as used herein, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed.

In a first example scenario, a customer brings merchandise to a check-out stand of a merchant, and uses a payment card, such as a credit card, to pay for the purchase. The payment card is swiped through a particular card reader coupled to a point-of-sale (POS) system of the merchant, and the POS system sends the payment card information to a remote computer system as part of the payment card authorization process. The computer system, during the authorization process, sends a message to the customer's smartphone requesting location information, and the smartphone sends its location information to the computer system in response to the request. Because these communications all happen within a relatively short period of time (e.g., a few seconds or less), the location reported by the smartphone is its approximate location during the card swipe.

Based on the reported location of the smartphone, an action is taken. When the smartphone is located near the geographic location where the card swipe occurs, or when the smartphone is located at the same place of business as the card reader, a determination is made to use a lower level of fraud screening for the purchase transaction because of the increased likelihood that the customer is involved in the card swipe. That is, the likelihood that a criminal is attempting to use a counterfeit copy of the payment card in connection with that transaction is greatly reduced, and a lower level of fraud screening can be used.

Further, this enables the usage of a streamlined checkout process, with the lower level of fraud screening resulting in fewer steps during the streamlined checkout process. Conversely, when the smartphone is at a different location during the card swipe, the risk that someone other than the customer is using the payment card is increased. That is, the likelihood that a criminal is attempting to use a counterfeit copy of the payment card in connection with that transaction is increased. Resultantly, a higher level of fraud screening can be used.

In a second example scenario, a customer brings merchandise to a check-out stand of a merchant, and uses a payment card, such as a credit card, to pay for the purchase. The payment card is swiped through a particular card reader coupled to a POS system of the merchant, and the POS system sends transaction information including identifying information for the merchant to a remote computer system as part of the payment card authorization process. The computer system establishes the location of the card reader as being at a place of business of the merchant based on the identifying information for the merchant. Using the established card reader location, the computer system subsequently determines whether the customer's smartphone is at the card reader location during the card swipe of the customer's payment card through the particular card reader.

For example, the computer system, during the authorization process, sends a message to the customer's smartphone requesting location information, and the smartphone sends its location information to the computer system in response to the request. The computer system determines, based on global positioning system (GPS) coordinates sent by the mobile device, that the mobile device is within a geo-fence associated with the merchant, and that the smartphone is at a place of business of the merchant.

A geo-fence is a pre-defined boundary, which can be, for example, circular, square, rectilinear, irregular in shape, etc. A geo-fence can define a location of a place of business of a merchant, such as with a geo-fence the borders of which track the outside walls of the merchant's place of business, or a circle the center of which is located inside the merchant's place of business and the radius of which corresponds to the size of the place of business.

When the smartphone is located within a certain proximity of the particular card reader during the card swipe, such as within a certain distance of the particular card reader or at the same merchant as the card reader, the presence of the customer at the merchant location is established with high confidence. Based on the location of the smartphone establishing with high confidence that the customer is at the merchant during the card swipe, a lower level of fraud screening and a streamlined checkout process are used.

To facilitate the technique, the location of a card reader can first be established. In a first example, a computer system has a database that associates a payment card of a customer with the customer's mobile device, such as a smartphone, the customer having previously logged in to a website to create the association. When the customer's payment card is swiped through a particular card reader of a POS system, the POS system communicates with the computer system as part of processing a payment. The computer system obtains contact information for the customer's mobile device from the database, and sends a message to the smartphone requesting location information, which the mobile device sends. After a number of other customers' mobile devices report a similar location during a card swipe at the particular card reader, the location of the particular card reader can be established at the geographic location reported by the mobile devices.

In a second example, when the customer's payment card is swiped through a particular card reader of a POS system of a merchant, the POS system communicates with the computer system as part of processing a payment. As part of the communication, the POS system sends an indication of the identity of the merchant, such as by sending a unique identification number associated with the merchant. The location of the card reader can be established as at a place of business of the merchant based on the indication of the identity of the merchant.

Once the location of the card reader is established, targeted ads can be served to the customer's mobile device based on the established location of the card reader, even when the customer's smartphone is unable to provide location information. For example, a customer may have location services disabled on his smartphone. With the location services disabled, the computer system is not able to obtain location information from the smartphone. However, when the customer makes a purchase at the merchant and his payment card is swiped through a particular card reader whose geographic location has been established, the computer system knows that the customer is likely located near the card reader, as the customer is likely involved in the card swipe. Targeted ads can therefore be sent to the customer's smartphone at that time, with the targeting based on the likelihood that the customer is located near the card reader, despite the absence of location information from the smartphone.

In the following description, the example of a financial transaction involving a merchant selling goods to a customer is presented, for illustrative purposes only, to explain various aspects of the technique. Note, however, that the technique introduced here is not limited in applicability to financial transactions, or to merchants and customers or to the sales of goods. The technique can be utilized with essentially any transaction that traditionally would be initiated by or involve the use of a card reader, such as checking out a library book using a library card that is read by a card reader. Further, while the specification uses the term "sale", as in point-of-sale (POS) for example, "sale" refers to any type of payment-oriented transaction, including for example a lease, a rental, or services, and is not limited to an actual purchase. Note also that in this description the terms "customer" or "payer" generally refer to the person making the payment related to the transaction, while "merchant" or "payee" generally refer to the person receiving the payment related to the transaction.

FIG. 1 is a high-level flow diagram of operations that can be performed by a computer system based on an established location of a card reader. The high-level level flow diagram will be explained in further detail in the flow diagrams of FIGS. 2-5. The process begins with step 105, where the computer system establishes the location of a particular card reader. In some embodiments, the location of the card reader can be established based on the identity of the merchant associated with the card reader. For example, the card reader is associated with a POS system of a merchant. When the POS system sends the transaction information associated with a card swipe, the POS system also sends identifying information for the merchant. For example, the POS system may send a unique identifier for the merchant, and based on unique identifier, the computer system establishes that the card reader is located at the merchant (i.e., at a place of business of the merchant).

A payment card can be, for example, a magnetic stripe card, a smart card including an embedded integrated circuit, a proximity card, a re-programmable magnetic stripe card, or a card containing an optical code such as a quick response (QR) code or a bar code. In other embodiments, the location of the card reader can be established by obtaining location information from multiple customers' mobile devices when the customers' payment cards are swiped through the particular card reader to make a payment. Step 105 is explained in more detail in the discussion below of steps 215-235 of FIG. 2B, and steps 250-255 of FIG. 2A.

The transactions of this example are financial transactions involving the sale of goods by a merchant to a customer. However, as discussed above, the technique introduced here is not limited to financial transactions. Multiple customers shop at the merchant's place of business, select goods to purchase, and take the goods to a POS system, such as POS system 651 of FIG. 7, where payment cards of each of the customers is swiped to pay for the goods. During the payment authorization process for each of the multiple payments, a remote computer system communicates with the customer's mobile device and causes the mobile device to send location information to the computer system. After a sufficient number of mobile devices all report nearly the same location (e.g., within some predetermined margin of error), as is represented by label 705 of FIG. 7, the location of the particular card reader can be approximated. For example, the location can be approximated by determining the center of mass of the reported locations with nearly the same location, as is represented by label 720 of FIG. 7. The location of the card reader can established at the approximated location, or at the location of one of the reported locations with nearly the same location.

Next, at step 110 the computer system determines the location of a customer's mobile device when the customer's transaction card is swiped through the particular card reader. Step 110 is explained in more detail in the discussion of steps 315-330 of FIG. 3. In some embodiments, the transaction card is a payment card and the payment card is swiped using the particular card reader. The computer system communicates with the customer's mobile device during the authorization process for the payment and causes the mobile device to send location information to the computer system (e.g., as determined by a global positioning system (GPS) module in the mobile device). Because the time duration of the authorization process is relatively short (e.g., a few seconds), it can be reasonably assumed that the received location information is in fact the location of the customer's mobile device at the time of the card swipe. Therefore, the computer system determines the location of the customer's mobile device during the card swipe based on the received location information. In some embodiments, the location information does not specify a geographic location of the mobile device, but rather a location of the mobile device at a place of business. For example, the mobile device can determine based on wireless communications that the mobile device is located at a merchant. More specifically, the mobile device can determine that it is located at a particular merchant based on the service set identifier (SSID) of a Wi-Fi network of the merchant, or based on near field communications with a POS system of the merchant.

In some embodiments, the transaction card is an identification card, such as a driver's license, and the transaction card is swiped using the particular card reader. As part of an identity verification process, the card reader sends the identification information obtained from the identity card to the computer system. The computer system communicates with the customer's mobile device and causes the mobile device to send location information to the computer system, as described above. Note that the transaction card can be other types of cards, and that the method can work with these other types of cards.

Next, at step 115 the computer system determines a degree of proximity between the customer's mobile device and the particular card reader. Step 115 is explained in more detail in the discussion of step 335 of FIG. 3. In this high-level example, the computer system determines the degree of proximity by comparing the location of the card reader as established in step 105 with the information location received from the customer's mobile device. The degree of proximity can be determined, for example, by determining the distance between these two locations, or by determining if both locations are at the merchant.

Next, at step 120 the computer system determines a level of fraud risk analysis for the payment based on the determined degree of proximity. Step 120 is explained in more detail in the discussion of step 340 of FIG. 3. When the determined degree of proximity indicates that the customer's mobile device is located near the card reader or at the same merchant as the card reader, the likelihood that someone other than the customer is using the payment card or the identification card is relatively low. In such cases, the computer system determines to use a reduced level of fraud analysis for the payment authorization or identity verification process. Conversely, when the determined degree of proximity indicates that the customer's mobile device is located at a location not near the card reader or is not at the merchant at which the card reader is located, the likelihood that someone other than the customer is using the payment card is higher. In such cases, the computer system determines to use a higher level of fraud analysis for the payment authorization or identity verification process.

Next, at step 125 the computer system determines a checkout flow based on the determined degree of proximity. Step 125 can be performed after step 115. Step 125 is discussed in more detail in the discussion of step 355 of FIG. 3. The checkout flow is the process that is executed by the POS system as part of a payment transaction. When the determined degree of proximity indicates that the customer's mobile device is located near the card reader or is located at the same merchant as the card reader, the computer system determines to use a streamlined checkout flow for the customer's purchase transaction. For example, the flow can be streamlined by reducing the steps required as part of the transaction, such as by not obtaining the customer's signature, or not checking the customer's identification.

Next, at step 130 the computer system selects a targeted ad based on the established location of the particular card reader. Step 130 can be performed after steps 115 or 120. Step 130 is discussed in more detail in the discussion of step 425 of FIG. 4. In some cases, a customer may have location services disabled on his mobile device, so the computer system may not be able to receive location information from the customer's mobile device at the time of the card swipe. However, because the location of the card reader was previously established, and because it is likely that the customer is located near the card reader or at the same merchant as the card reader during the card swipe, the computer system can select a targeted ad to send to the customer's mobile device based on the established location of the particular card reader.

Figure 2A:
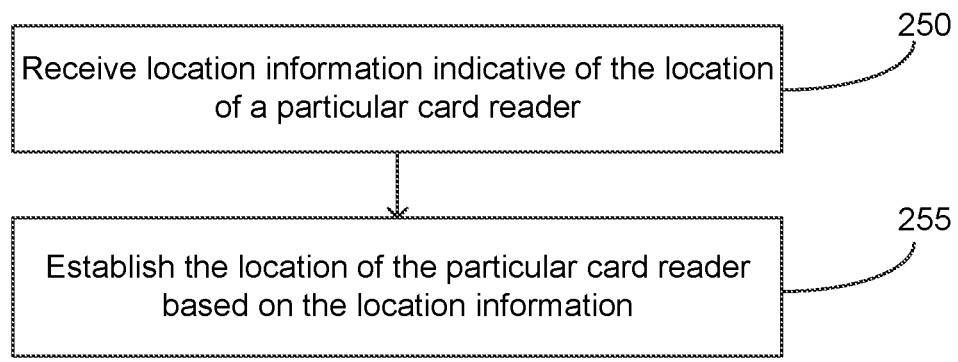
FIG. 2A is a flow diagram illustrating a first example of a process that can be performed by a computer system for establishing the location of a card reader.

FIG. 2A is a flow diagram illustrating a first example of a process that can be performed by a computer system for establishing the location of a card reader. The process starts at step 250 with a computer system, such as computer system 670 or 671, receiving location information indicative of the location of a particular card reader. In some embodiments, the location information is a unique identifier that is associated with the merchant that is sent by a POS system, such as POS system 650 or 651. In some embodiments, the location information is GPS coordinates of a location corresponding to the location of the card reader. For example, POS system 651 can contain a GPS module and send the GPS coordinate as determined by the GPS module to computer system 670. Next, at step 255 the computer system establishes the location of the card reader as at the merchant. When the location information is a unique identifier that is associated with the merchant, the computer system establishes the location of the card reader as being at the merchant. When the location information is a GPS coordinate, the computer system can determine that the GPS coordinate is within a geo-fence associated with the merchant, or can determine that the GPS is associated with the merchant based on a mapping service such as Google Maps®. The computer system can establish the location of the card reader based on the GPS coordinate, and can establish the location of the card reader as being at the merchant.

Figure 2B:
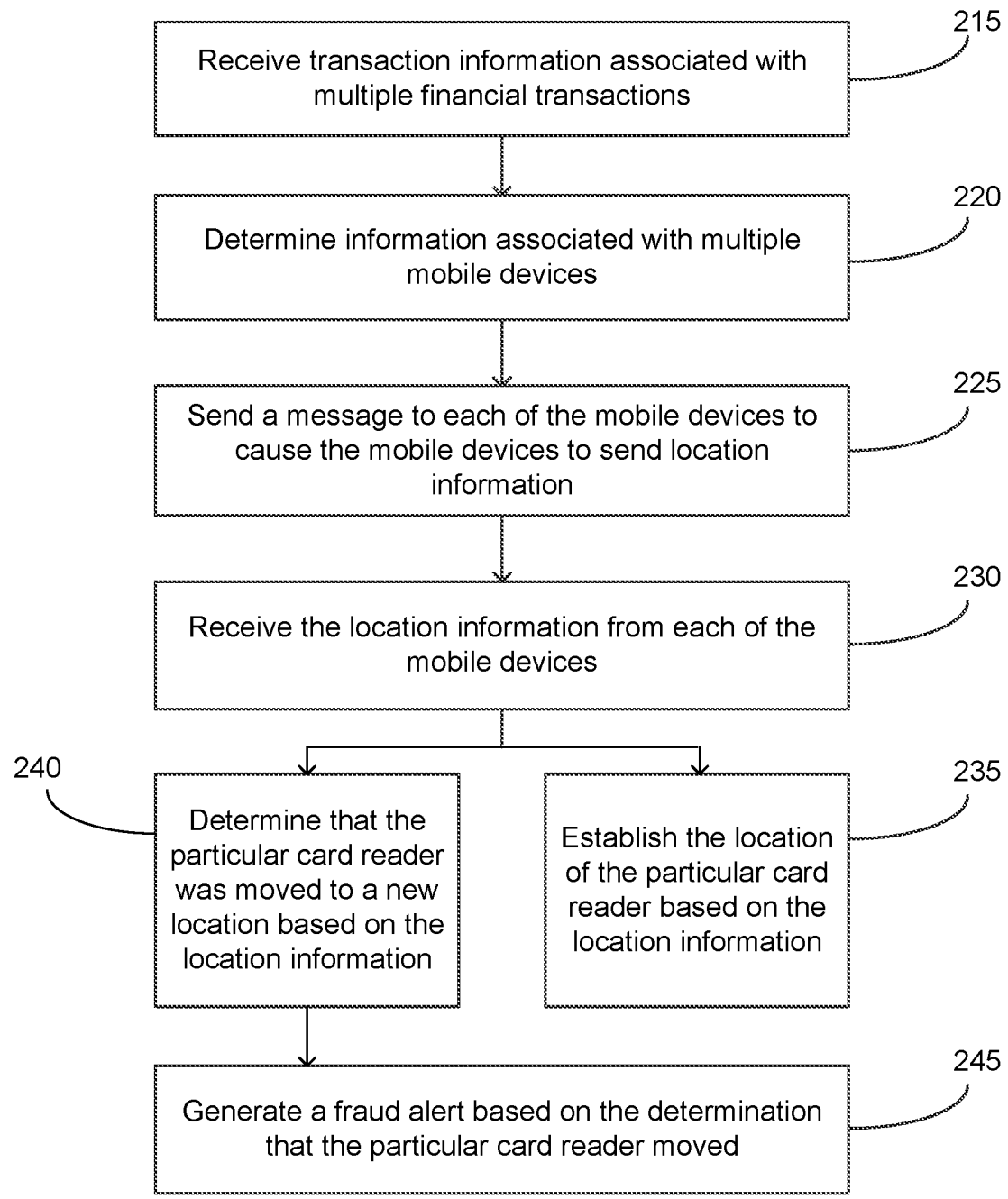
FIG. 2B is a flow diagram illustrating a second example of a process that can be performed by a computer system for establishing the location of a card reader.
Figure 6:
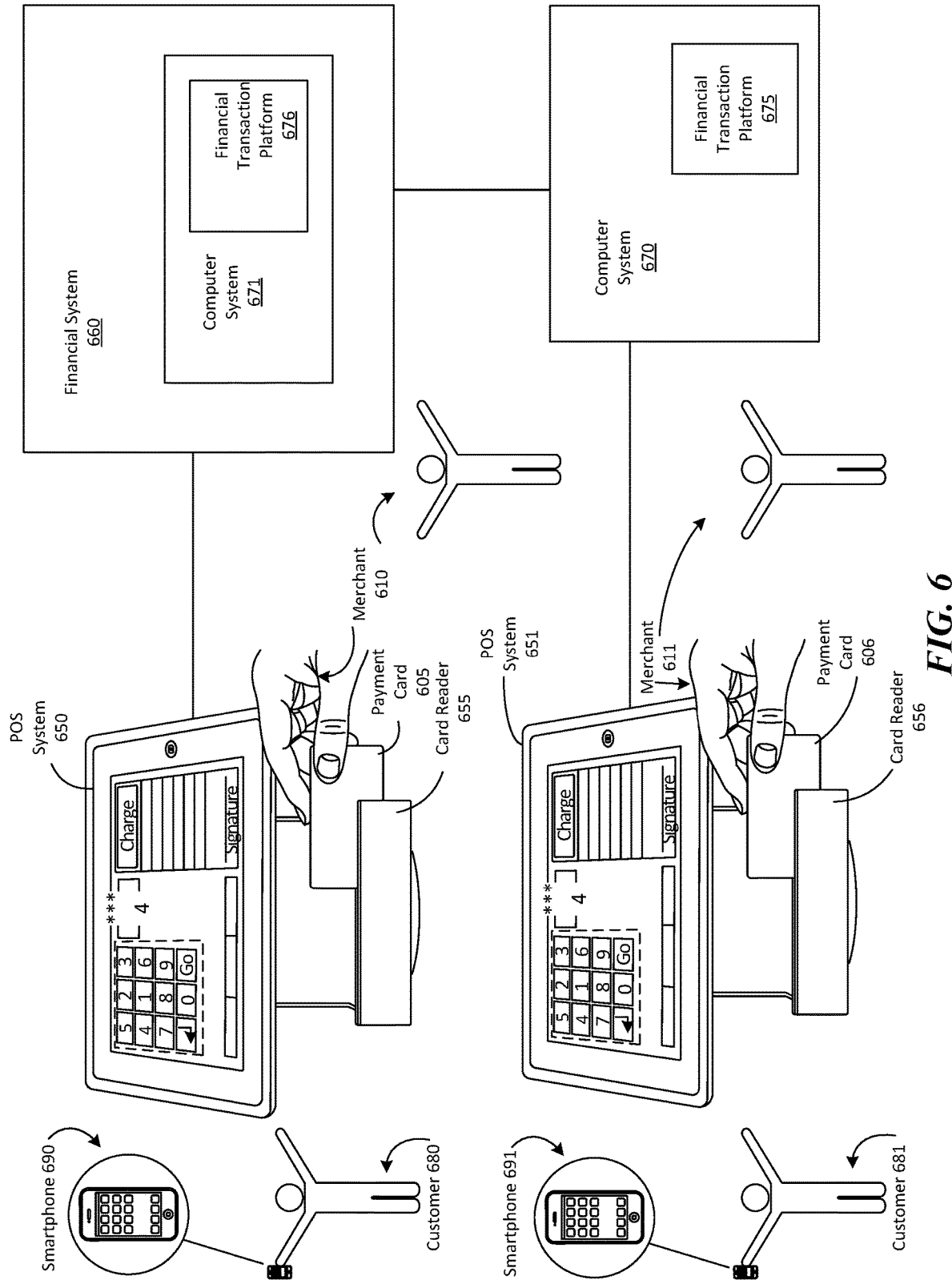
FIG. 6 is an environment in which the techniques introduced here can be implemented.

FIG. 2B is a flow diagram illustrating a second example of a process that can be performed by a computer system for establishing the location of a card reader. This example process will be explained using the example environment of FIG. 6, and will refer to labels of that figure. Different variations of the process of FIG. 2B will be explained in relation to three examples. In the first example, POS system 651 is coupled to computer system 670 and/or financial transaction platform 675, as depicted in FIG. 6. POS system 650, financial system 660, computer system 671, and financial transaction platform 676 need not be involved in this example. At step 215, computer system 670 and/or financial transaction platform 675 receive transaction information associated with multiple financial transactions from POS system 651. In this example, multiple financial transactions are initiated between multiple customers and merchant 611. The financial transactions involve the sale of goods by merchant 611 to the multiple customers, including customer 681, using POS system 651. The customers shop at the merchant 611's place of business, select goods to purchase, and take the goods to POS system 651. As part of the purchase process, the merchant rings up the goods using POS system 651, such as by scanning bar codes on the goods with a scanner coupled to the POS system.

After all the goods are rung up, POS system 651 calculates the total amount of the purchase. Each customer provides a payment card, and the payment card is swiped through card reader 656, such as by either the customer or merchant 611. POS system 651 sends the transaction information associated with the multiple transactions, and computer system 670 and/or financial transaction platform 675 accordingly receive the transaction information. After the payment card provided by one of the multiple customers is swiped, card reader 656 obtains information from the payment card, such as by reading the magnetic strip on the back of a credit card. In some embodiments, various information, such as the information from the payment card, the transaction information, and information regarding the merchant, is sent by POS system 651 to computer system 670 and/or financial transaction platform 675, which can be implemented on computer system 670. The information from the payment card is referred to herein as the payment card information. The transaction information includes the amount of the payment, and can additionally include a listing of items associated with the financial transaction, such as the listing of the goods rung up by the POS system, as well as information regarding the merchant. The various information is accordingly received by computer system 670 and/or financial transaction platform 675.

In some embodiments, the payment card is a proxy card. A proxy card is a payment card that can be associated with multiple payment accounts. In some embodiments, the proxy card is a software proxy card with the association between the proxy card and the multiple payment accounts maintained by a server computer. In some embodiments, the proxy card is a hardware proxy card, with the association between the proxy card and the multiple payment accounts stored in non-volatile storage of the proxy card. For example, a proxy card, which can be a magnetic stripe card similar to a credit card, is associated with a payment account that is associated with a credit card, a payment account that is associated with a debit card, a payment account that is associated with an ATM card, and a payment account that is associated with a pre-paid gift card. In this example, the proxy card is a software proxy card. The proxy card is swiped by card reader 656, and POS system 651 sends the various information to computer system 670 and/or financial transaction platform 675.

Next, at step 220 computer system 670 and/or financial transaction platform 675 receive information associated with mobile devices associated with the authorized users of the cards used in the above-mentioned transactions. An example of such a mobile device is a smartphone 691. Computer system 670 and/or financial transaction platform 675 determine information associated with the multiple mobile devices of the cardholders. Computer system 670 and/or financial transaction platform 675 have access to a database containing information associated with payment cards. The database contains, for example, contact information, such as phone numbers or internet protocol (IP) addresses, of mobile devices that are associated with the payment cards. Computer system 670 and/or financial transaction platform 675 determine the information associated with the multiple mobile devices by accessing the database to obtain the contact information associated with the mobile devices.

Figure 7:
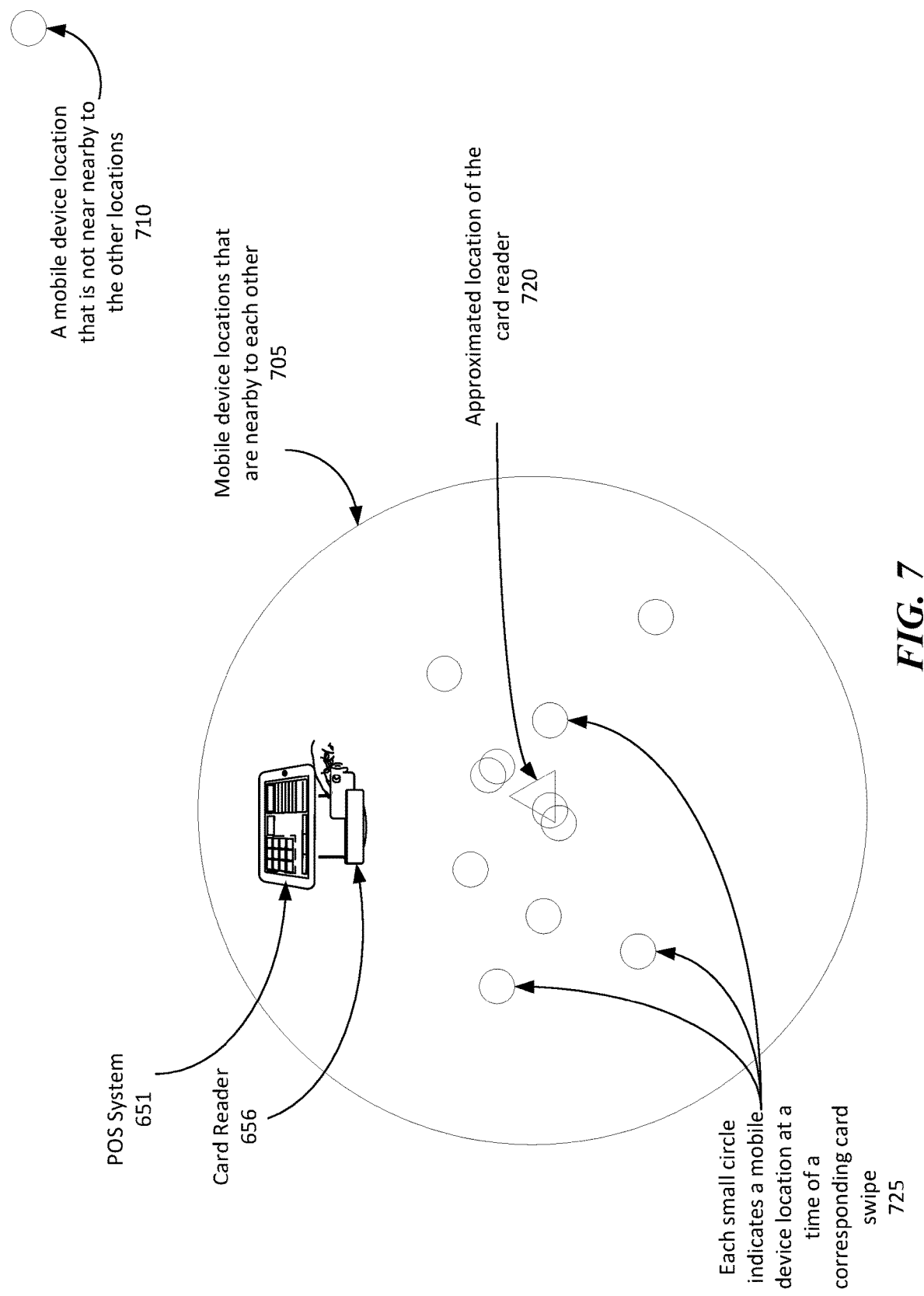
FIG. 7 is an illustration of mobile device locations at a time of a corresponding card swipe.

Next, at step 225 computer system 670 and/or financial transaction platform 675 send a message to each of the mobile devices to cause the mobile devices to send location information. Computer system 670 and/or financial transaction platform 675, having contact information for the mobile devices, sends a message to each of the mobile devices to cause the mobile devices to send their location information to the computer system. The message can be sent in via an IP message, a text message (e.g., card message service (SMS) message), an email, etc. The mobile device, in response to the received message, determines its geographical location, such as based on the location as determined by a GPS module associated with the mobile device. The mobile device, also in response to the received message, sends the location information to computer system 670 and/or financial transaction platform 675. FIG. 7 depicts the geographic location of POS system 651 and card reader 656, along with the locations of the mobile devices (see labels 710 and 725) when the corresponding card swipes happen.

Next, at step 230 computer system 670 and/or financial transaction platform 675 receive the location information from each of the mobile devices. Computer system 670 and/or financial transaction platform 675 receive the location information that was sent by the mobile devices during step 225. Next, at step 235 computer system 670 and/or financial transaction platform 675 establish the location of the particular card reader based on the location information. Computer system 670 and/or financial transaction platform 675 establish the location of card reader 656 based on the location information that was received during step 230. In some cases, when the payment card is swiped through card reader 656 during step 210, the mobile device associated with the payment card may be located at a location different from that of the card reader 656, as is illustrated by label 710 of FIG. 7. This may be because, for example, the customer left his mobile device at a different location, such as his home or his car, or lent his mobile device to another person who is at a different location at the time of the card swipe. As a result, computer system 670 and/or financial transaction platform 675 can receive location information indicating a number of different locations, as is depicted in FIG. 7. However, the location information compiled from multiple transactions over time will generally indicate that a large number of mobile devices were at very nearly the same location during corresponding card swipes, as is illustrated by label 705 of FIG. 7. Once the location information from a sufficient number of mobile devices all indicate substantially the same location, computer system 670 and/or financial transaction platform 675 can approximate the location of card reader 656, as is illustrated by label 720 of FIG. 7. The location of card reader 656 can be established at the approximated location 720 of card reader 656.

Next, at step 240 computer system 670 and/or financial transaction platform 675 determine that the particular card reader was moved to a new location based on the location information. Steps 205-230 are continuously repeated, even after the location of the particular card reader is established, as each new customer purchases goods and makes a payment using the particular card reader. The merchant, at a certain point in time, may move POS system 651, including card reader 656, to a new location. Computer system 670 and/or financial transaction platform 675 determines that the percentage of mobile devices that are located near card reader 656 when an associated payment card is swiped drops to near zero.

At this point, computer system 670 and/or financial transaction platform 675 analyze the location information and determine that, after a certain point of time, a large number of mobile devices indicated very nearly the same location, but the location is different from the earlier established location of card reader 656. Based on this new location information data, computer system 670 and/or financial transaction platform 675 establish that card reader 656 was moved to a new location, and also establish that new location as the location of the card reader, based on the new location information data.

Next, at step 245 computer system 670 and/or financial transaction platform 675 generate a fraud alert based on the determination that the particular card reader moved. For example, computer system 670 and/or financial transaction platform 675 generate a fraud alert indicating that card reader 656 may have been stolen.

The second example covers steps 205-235 for a scenario where the computer system is part of a financial system. In the second example, POS system 650 is coupled to computer system 671 and/or financial transaction platform 671 via financial system 660, as is depicted in FIG. 6. POS system 651, computer system 670, and financial transaction platform 675 need not be involved in this example. This example begins at step 215, where computer system 671 and/or financial transaction platform 676 receive transaction information associated with multiple financial transactions from POS system 650 via financial system 660. In this example, multiple financial transactions are initiated between multiple customers and merchant 610. The financial transactions involve the sale of goods by merchant 610 to the multiple customers, including customer 680, using POS system 650. The customers shop at the merchant 610's place of business, select goods to purchase, and take the goods to POS system 650. As part of the purchase process, the merchant rings up the goods using POS system 650, such as by scanning bar codes on the goods with a scanner coupled to the POS system.

After all the goods are rung up, POS system 650 calculates the total amount of the purchase. Each customer provides a payment card, and the payment card is swiped through card reader 655, such as by either the customer or merchant 610. POS system 650 sends the transaction information associated with the multiple transactions, and computer system 671 and/or financial transaction platform 676 accordingly receive the transaction information via financial system 660. After the payment card provided by one of the multiple customers is swiped, card reader 655 obtains information from the payment card, such as by reading the magnetic strip on the back of a credit card. In some embodiments, various information, such as the information from the payment card, the transaction information, and information regarding the merchant, is sent by POS system 650 to computer system 671 and/or financial transaction platform 676, which can be implemented on the computer system 671, via financial system 660. The transaction information includes the amount of the payment, and can additionally include a listing of items associated with the financial transaction, such as the listing of the goods rung up by the POS system, as well as information regarding the merchant. The various information is accordingly received by computer system 671 and/or financial transaction platform 676.

Financial system 660 can process electronic payments, such as a payment made using a payment card, and can transfer funds related to the electronic payments, such as from an account associated with the payment card to an account associated with the payee. Financial system 660 can include processing services, such as Bank of American Merchant Services, financial services, such as VISA's VisaNet Payment System, and banking services, such as Chase Bank. A person having ordinary skill in the art will appreciate that there are many possible financial systems. Computer system 671 and/or financial transaction platform 676 are part of financial system 660, and the various information sent to financial system 660 is received by computer system 671 and/or financial transaction platform 676. In some embodiments, computer system 671 and/or financial transaction platform 676 is controlled by a processing service. In some embodiments, computer system 671 and/or financial transaction platform 676 is controlled by a financial service. In some embodiments, computer system 671 and/or financial transaction platform 676 is controlled by a banking service.

The payment card can be a proxy card. The proxy card is swiped by card reader 655, and POS system 650 sends the various information to financial system 660, where it can be received by computer system 671 and/or financial transaction platform 676. In some embodiments, the various information including the proxy card information is received by a processing service, and the processing service relays the various information to computer system 671 and/or financial transaction platform 676. In some embodiments, the various information including the proxy card information is received by a processing service, the processing service relays the various information to a financial service, and the financial service relays the various information to computer system 671 and/or financial transaction platform 676.

Next, at step 220 computer system 671 and/or financial transaction platform 676 determine information associated with multiple mobile devices. Computer system 671 and/or financial transaction platform 676 determine the information associated with the multiple mobile devices, an example of a mobile device being smartphone 690. Computer system 671 and/or financial transaction platform 676 have access to a database containing information associated with payment cards. The database contains, for example, contact information, such as phone numbers or IP addresses, of mobile devices that are associated with the payment cards. Computer system 671 and/or financial transaction platform 676 determine the information associated with the multiple mobile devices by accessing the database to obtain the contact information associated with the mobile devices.

Next, at step 225 computer system 671 and/or financial transaction platform 676 send a message to each of the mobile devices to cause the mobile devices to send location information. Computer system 671 and/or financial transaction platform 676, having contact information for the mobile devices, send a message to each of the mobile devices to cause the mobile devices to send location information. The message can be sent in via an IP message, a text message, an email, etc. The mobile device, in response to the received message, determines its geographical location, such as based on the location as determined by a GPS module associated with the mobile device. The mobile device, also in response to the received message, sends the location information to computer system 671 and/or financial transaction platform 676.

Next, at step 230 computer system 671 and/or financial transaction platform 676 receive the location information from each of the mobile devices. Computer system 671 and/or financial transaction platform 676 receive the location information that was sent by the mobile devices during step 225. Next, at step 235 computer system 671 and/or financial transaction platform 676 establish the location of the particular card reader based on the location information. Computer system 671 and/or financial transaction platform 676 establish the location of card reader 655 based on the location information that was received during step 230. In some cases, when the payment card is swiped through card reader 655 during step 210, the mobile device associated with the payment card is located at a different location than card reader 655. This is because, for example, the customer left his mobile device at a different location, such as his home or his car, or lent his mobile device to another person who is at a different location at the time of the card swipe. As a result, computer system 671 and/or financial transaction platform 676 can receive location information indicating a number of different locations. However, the location information will indicate that a large number of mobile devices are at very nearly the same location. Once the location information from a sufficient number of mobile devices all indicate substantially the same location, computer system 671 and/or financial transaction platform 676 can establish the location of card reader 655 at that location.

The third example covers steps 205-235 for a scenario where a software proxy card is used, the POS system sends the information to a financial system, and the computer system is not part of the financial system. In the third example, POS system 650 is coupled to computer system 670 and/or financial transaction platform 675 via financial system 660, as is depicted in FIG. 6. Computer system 671 and financial transaction platform 676 need not be involved in this example. This example begins at step 215, where computer system 670 and/or financial transaction platform 675 receive transaction information associated with multiple financial transactions from POS system 650 via financial system 660. In this example, multiple financial transactions are initiated between multiple customers and merchant 610. The financial transactions involve the sale of goods by merchant 610 to multiple customers, including customer 680, using POS system 650. The customers shop at the merchant 610's place of business, select goods to purchase, and take the goods to POS system 650. As part of the purchase process, the merchant rings up the goods using POS system 650, such as by scanning bar codes on the goods with a scanner coupled to the POS system.

After all the goods are rung up, POS system 650 calculates the total amount of the purchase. Each customer provides a payment card, and the payment card is swiped through card reader 655, such as by either the customer or merchant 610. POS system 650 sends the transaction information associated with the multiple transactions, and computer system 670 and/or financial transaction platform 675 accordingly receive the transaction information via financial system 660. After the payment card, in this example a software proxy card, provided by one of the multiple customers is swiped, card reader 655 obtains information from the payment card, such as by reading the magnetic strip on the back of the proxy card. In some embodiments, various information, such as the information from the payment card, the transaction information, and information regarding the merchant, is sent by POS system 650 to financial system 660. Financial system 660 can include processing services, such as Bank of American Merchant Services, financial services, such as VISA's VisaNet Payment System, and banking services, such as Chase Bank. A person having ordinary skill in the art will appreciate that there are many possible financial systems.

Financial system 660, based on the various information, determines to relay the various information to computer system 670 and/or financial transaction platform 675. The various information includes proxy card information, and the proxy card information includes meta-data that financial system 660 uses to determine to relay the various information. For example, the meta-data can indicate to forward the data to computer system 670 and/or financial transaction platform 675 by including a command instructing financial system 660 to forward the various information. The meta-data can include the IP address of or phone number associated with computer system 670 as the forwarding destination, among other ways of providing the forwarding destination. In one embodiment, a financial service, such as VISA's VisaNet Payment System, makes the determination based on the meta-data to relay the various information to computer system 670 and/or financial transaction platform 675.

Next, at step 220 computer system 670 and/or financial transaction platform 675 determine information associated with multiple mobile devices. Computer system 670 and/or financial transaction platform 675 determine the information associated with the multiple mobile devices, an example of a mobile device being smartphone 690. Computer system 670 and/or financial transaction platform 675 have access to a database containing information associated with payment cards. The database contains, for example, contact information, such as phone numbers or IP addresses, of mobile devices that are associated with the payment cards. Computer system 670 and/or financial transaction platform 675 determine the information associated with the multiple mobile devices by accessing the database to obtain the contact information associated with the mobile devices.

Next, at step 225 computer system 670 and/or financial transaction platform 675 send a message to each of the mobile devices to cause the mobile devices to send location information. Computer system 670 and/or financial transaction platform 675, having contact information for the mobile devices, send a message to each of the mobile devices to cause the mobile devices to send location information. The message can be sent in via an IP message, a text message, an email, etc. The mobile device, in response to the received message, determines its geographical location, such as based on the location as determined by a GPS module associated with the mobile device. The mobile device, also in response to the received message, sends the location information to computer system 670 and/or financial transaction platform 675.

Next, at step 230 computer system 670 and/or financial transaction platform 675 receive the location information from each of the mobile devices. Computer system 670 and/or financial transaction platform 675 receive the location information that was sent by the mobile devices during step 225. Next, at step 235 computer system 670 and/or financial transaction platform 675 establish the location of the particular card reader based on the location information. Computer system 670 and/or financial transaction platform 675 establish the location of card reader 655 based on the location information that was received during step 230. In some cases, when the payment card is swiped through card reader 655 during step 210, the mobile device associated with the payment card is located at a different location than card reader 655. This is because, for example, the customer left his mobile device at a different location, such as his home or his car, or lent his mobile device to another person who is at a different location at the time of the card swipe. As a result, computer system 670 and/or financial transaction platform 675 can receive location information indicating a number of different locations. However, the location information will indicate that a large number of mobile devices are at very nearly the same location. Once the location information from a sufficient number of mobile devices all indicate substantially the same location, computer system 670 and/or financial transaction platform 675 can establish the location of card reader 655 at that location.

Figure 3:
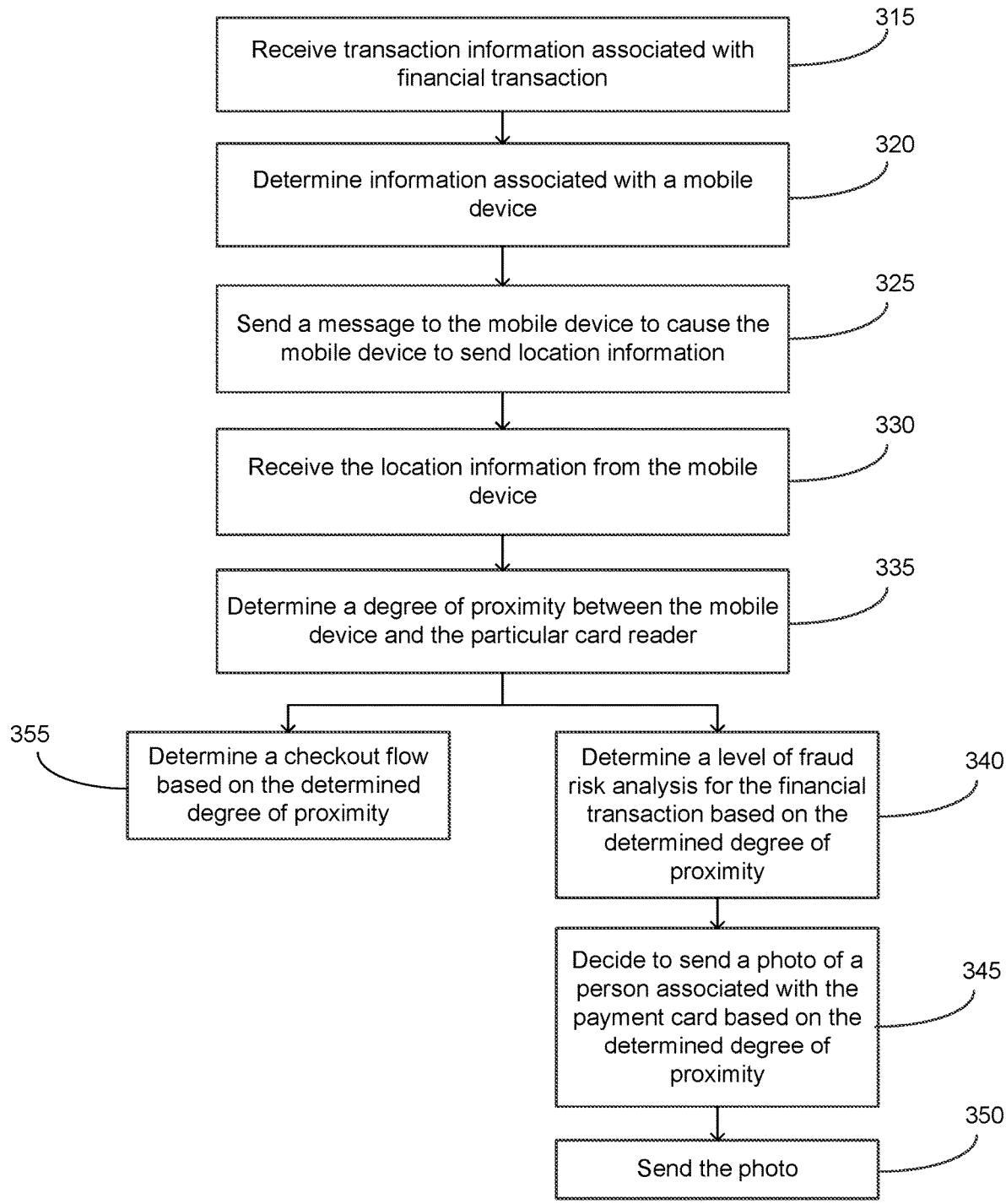
FIG. 3 is a flow diagram of illustrating an example of a process for determining a level of fraud risk analysis based on the proximity between a customer's mobile device and the card reader.

FIG. 3 is a flow diagram of illustrating an example of a process for determining a level of fraud risk analysis based on the proximity between a customer's mobile device and the card reader. Steps 315-330 are respectively the same as steps 215-230 of FIG. 2B, just performed related to a selected transaction involving the particular card reader, after the location of the particular card reader has been established. In steps 215-230, transaction information and the locations of multiple mobile devices during multiple card swipes related to multiple financial transactions are received. In steps 315-330, transaction information and the location of a mobile device during a card swipe related to a selected transaction is received. The transaction can be a financial transaction, or another type of transaction, such as verifying an identity of a person using an identification card, as is discussed in the description of step 110 of FIG. 1. In some embodiments, the location information of step 330 does not specify a geographic location of the mobile device, but rather a location of the mobile device as being at a place of business. For example, the mobile device determines based on wireless communications that the mobile device is located at a merchant. The mobile device can determine that it is at a merchant based on the service set identifier (SSID) of a Wi-Fi network of the merchant, or based on near field communications with a POS system of the merchant, among other ways. Next, at step 335 computer system 670 and/or financial transaction platform 675, or computer system 671 and/or financial transaction platform 676 determine a degree of proximity between the mobile device and the particular card reader. In step 235 of FIG. 2B, as well as step 250 of FIG. 2A, the location of the particular card reader was established. The location of the mobile device is determined based on the location information received during step 330. In various embodiments, computer system 670 and/or financial transaction platform 675, or computer system 671 and/or financial transaction platform 676 determine the degree of proximity. The degree of proximity between the mobile device and the particular card reader is determined by calculating the distance between the mobile device and the established location of the particular card reader, or by determining if the mobile device and the card reader are at the same merchant.

Next, at step 340 computer system 670 and/or financial transaction platform 675, or computer system 671 and/or financial transaction platform 676 determine a level of fraud risk analysis for the financial transaction based on the determined degree of proximity. By validating that the customer's smartphone is located at substantially the same location as the particular card reader, or within a defined proximity of the particular card reader, or at the same merchant as the card reader, when the financial transaction is occurring, the risk that someone has stolen or forged the customer's payment card is greatly reduced. Because this risk is greatly reduced, the level of fraud risk analysis for the financial transaction can be reduced. Conversely, when the customer's smartphone is located at a different location than the particular card reader, or is not located at the same merchant as the particular card reader, the risk that someone has stolen or forged the customer's payment card is increased. In this case, the level of fraud risk analysis is not reduced and can even be increased. In various embodiments, computer system 670 and/or financial transaction platform 675, or computer system 671 and/or financial transaction platform 676 determine the level of level of fraud risk analysis.

Next, at step 345 computer system 670 and/or financial transaction platform 675, or computer system 671 and/or financial transaction platform 676 decide to send a photo of a person associated with the payment card based on the determined degree of proximity. Reducing the level of fraud risk analysis can have various effects. For example, the customer may be required to provide identification or provide a signature at one fraud risk analysis level, and may not be required to provide identification or provide a signature at a reduced level of fraud risk analysis. As part of a reduced level of fraud analysis, a photo can be sent to the POS system being used for the transaction for the merchant to use in place of asking the customer to provide government issued identification. The photo can be associated with the payment card used for the financial transaction via a database.

A photo can also be sent to the POS system as part of a higher level of fraud risk analysis. For example, no identification or any signature may be required for a transaction for a relatively small amount. When the fraud risk level is heightened based on the determined degree of proximity, a photo can be sent to the POS system as part of a higher level of fraud risk analysis. In various embodiments, computer system 670 and/or financial transaction platform 675, or computer system 671 and/or financial transaction platform 676 decide to send the photo. Next, at step 350 computer system 670 and/or financial transaction platform 675, or computer system 671 and/or financial transaction platform 676 send the photo. In various embodiments, computer system 670 and/or financial transaction platform 675, or computer system 671 and/or financial transaction platform 676 send the photo to the POS system used for the financial transaction.

Next, at step 355 computer system 670 and/or financial transaction platform 675, or computer system 671 and/or financial transaction platform 676 determine a checkout flow based on the determined degree of proximity. The checkout flow in this example is the flow associated with the financial transaction that is executed by the POS system used for the financial transaction. Just as the level of fraud risk analysis can change based on the determined degree of proximity, the checkout flow can similarly change based on the determined degree of proximity. For example, when the determined degree of proximity indicates a lower risk of a fraudulent transaction, a streamlined checkout flow is used. In various embodiments, computer system 670 and/or financial transaction platform 675, or computer system 671 and/or financial transaction platform 676 determine, based on the degree of proximity, to use a streamlined checkout flow, and communicate to the POS system used for the financial transaction an indication to use the streamlined checkout flow. The flow can be streamlined, for example, by reducing the number of steps in the checkout process, such as by eliminating a step where the customer's signature is obtained, or by eliminating a step where the customer's identification is checked.

Figure 4:
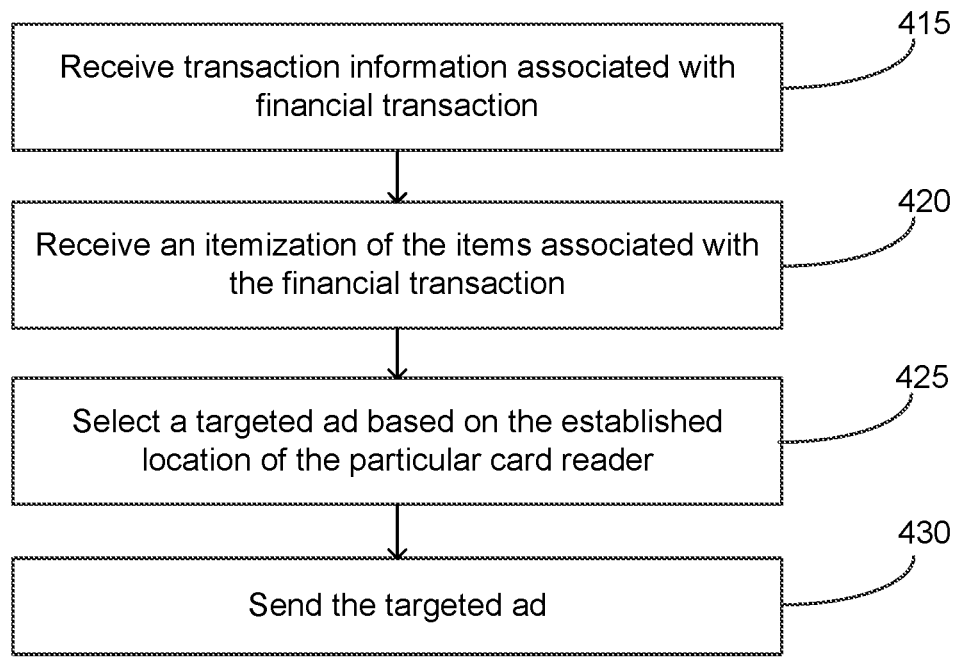
FIG. 4 is a flow diagram illustrating an example of a process for selecting a targeted ad based on the location of a card swipe.

FIG. 4 is a flow diagram illustrating an example of a process for selecting a targeted ad based on the location of a card swipe. This example process will be explained using the example environment of FIG. 6, and will refer to labels of that figure. Step 415 is the same as step 215 of FIG. 2B, just performed related to a selected financial transaction. In step 215, transaction information associated with multiple financial transactions is received. Next, at step 415, at a high level, computer system 670 and/or financial transaction platform 675 receive transaction information associated with a financial transaction. For example: customer 681 initiates a financial transaction with merchant 611 related to the purchase of merchandise; payment card 606 is swiped through card reader 656 to pay for the financial transaction associated with the sale of the merchandise; and, computer system 670 and/or financial transaction platform 675 receive transaction information from POS system 651 related to the financial transaction.

Next, at step 420 computer system 670 and/or financial transaction platform 675 receive an itemization of the items associated with the financial transaction. The itemization of the items can include a list of the merchandise that was scanned or otherwise rung up by POS system 651 related to the financial transaction. Where the financial transaction is related to services, the itemization of the items can include a list of services to be provided. Where the financial transaction is related to rentals, the itemization of the items can include a list of the items to be rented.

Next, at step 425 computer system 670 and/or financial transaction platform 675 select a targeted ad based on the established location of the particular card reader. By following steps 215-235 of FIG. 2B, or steps 250-255 of FIG. 2A, the location of card reader 656 can have been previously established. Computer system 670 and/or financial transaction platform 675 select a targeted ad based on the location of the particular card reader as established during step 235 of FIG. 2B or step 255 of FIG. 2A. Note that the location is selected, not based on the location as determined based on location information from smartphone 691, but rather based on the established location of the particular card reader. Smartphone 691 can have location based services disabled or turned off, or the GPS module of smartphone 691 can even be non-functional with smartphone 691 not being able to determine its location, and a targeted ad can still be selected. This is because the selection of the targeted ad is based on the established location of POS system 651, which can be determined without any location information from smartphone 691. Computer system 670 and/or financial transaction platform 675 select an ad for a store near to the established location of card reader 656.

Further, computer system 670 and/or financial transaction platform 675 can select a targeted ad based on the established location of the particular card reader and on the itemization of the items. The itemization of the items includes a list of merchandise that is being purchased by customer 681. Computer system 670 and/or financial transaction platform 675 analyze the list of merchandise, and determine that customer 681 is shopping for shoes based on the list containing shoes. Computer system 670 and/or financial transaction platform 675 select an ad for a shoe store near to the established location of card reader 656. Next, at step 430 computer system 670 and/or financial transaction platform 675 send the targeted ad. Computer system 670 and/or financial transaction platform 675 send the targeted ad to smartphone 691, and the ad is displayed on smartphone 691.

Figure 5:
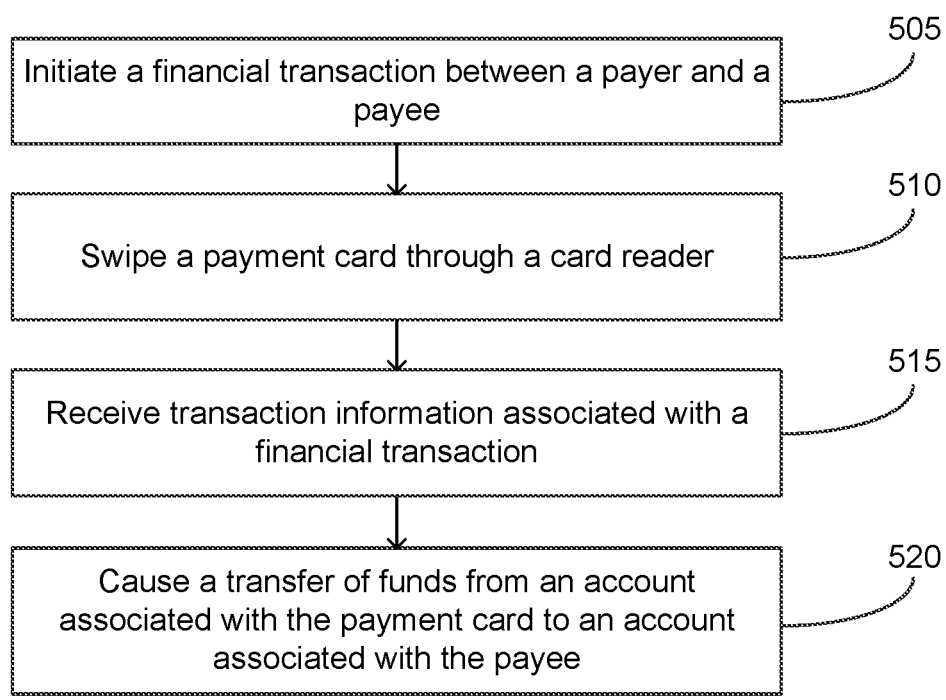
FIG. 5 is a flow diagram illustrating an example of a process for enabling a merchant to engage in a financial transaction with a customer.

FIG. 5 is a flow diagram illustrating an example of a process for enabling a merchant to engage in a financial transaction with a customer. This example process will be explained using the example environment of FIG. 6, and will refer to labels of that figure. While the financial transaction of this example is related to the sale of merchandise, the technique is generally applicable to any type of financial transaction that involves an electronic payment, such as a financial transaction related to services or rentals, among others. While this example is a process for enabling a merchant to engage in a financial transaction with a customer, the same process repeated for multiple customers and multiple merchants can enable the multiple merchants to engage in multiple financial transactions with the multiple customers.

At step 515, computer system 670 and/or financial transaction platform 675 receive transaction information associated with a financial transaction. A financial transaction is initiated between a payer and a payee. Referring to FIG. 6, customer 681, a payer, initiates a financial transaction with merchant 611, a payee. Customer 681 initiates the financial transaction by bringing merchandise he obtained while shopping at the place of business of merchant 611 to POS system 651, and merchant 611 rings up the merchandise using POS system 651. Customer 681 then presents payment card 606 to pay for the financial transaction associated with merchandise purchase. Customer 681 or merchant 711 swipe payment card 606 through card reader 656. Card reader 656 obtains payment card information from payment card 606 and sends the payment card information to POS system 651, to which card reader 656 is coupled. POS system 651 sends the payment card information, along with the transaction information, to computer system 670 and/or financial transaction platform 675, where the information is received.

Next, at step 520 computer system 670 and/or financial transaction platform 675 cause a transfer of funds from an account associated with the payment card to an account associated with the payee. The account associated with the payment card and/or the account associated with the payee can be at financial transaction platform 675, a bank, a credit union, etc. In some embodiments, computer system 670 and/or financial transaction platform 675 work in conjunction with financial system 660 to cause the transfer of funds.

FIG. 6 is an environment in which the techniques introduced here can be implemented. FIG. 6 includes payment card 605 and 606, card reader 655 and 656, POS system 650 and 651, payment card 605 and 606, customer 680 and 681, smartphone 690 and 691, merchant 610 and 611, financial system 660, computer system 670 and 671, and financial transaction platform 675 and 676. The components of this figure are discussed in the descriptions related to FIGS. 1-5.

The environment of FIG. 6 is discussed relative to three communication scenarios. The first scenario has POS system 651 communicating with computer system 670 and/or financial transaction platform 675 to process a payment transaction. The second scenario has POS system 650 communicating with computer system 671 and/or financial transaction platform 676 via financial system 660 to process a payment transaction. The third scenario has POS system 650 communicating with computer system 670 and/or financial transaction platform 675 via financial system 660 to process a payment transaction. These three scenarios are discussed in above the description of FIG. 2B. A person of ordinary skill will recognize that many other scenarios are possible.

FIG. 7 is an illustration of mobile device locations at a time of a corresponding card swipe. FIG. 7 is discussed in the description of FIG. 2B. In one example, a computer system has a database that associates a payment card of a customer with the customer's smartphone. When the customer's payment card is swiped through card reader 656 of POS system 651, POS system 651 communicates with the computer system as part of processing the payment initiated by the card swipe. The computer system obtains contact information for the customer's smartphone from the database, and sends a message to the smartphone requesting location information, which the smartphone sends to the computer system. The location of the smartphone is indicated by one of the small circles of FIG. 7, such as one of the small circles indicated by labels 725 or 710.

This process is repeated for a number of customers, and a number of mobile device locations are received by the computer system, as is represented by the small circles of FIG. 7. Some of the mobile device locations are not near the locations of other mobile devices, as is indicated by label 710. This may be caused, for example, by the customer leaving his smartphone in his car. After a number of the customers' mobile devices report a similar location during a card swipe at card reader 656, as is indicated by label 705, the location of card reader 656 can be established. Mobile device locations that are not near the grouping of mobile device location, such as label 710, can be ignored. The locations of the mobile devices that are nearby each other, as is indicated by label 705, can be used to approximate the location of card reader 656, as is indicated by label 720.

Figure 8:
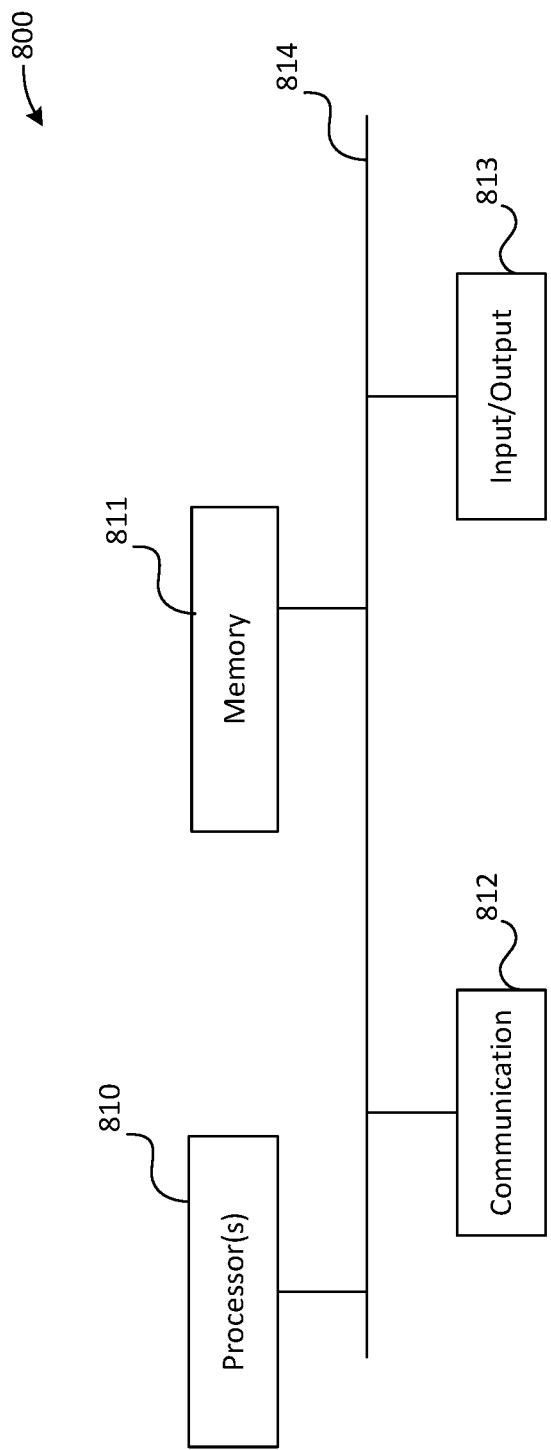
FIG. 8 is a high-level block diagram showing an example of a processing system in which at least some operations related to basing actions on a location of a card swipe can be implemented.

FIG. 8 is a high-level block diagram showing an example of a processing device 800 that can represent any of the devices described above, such as POS system 650 or 651, smartphone 690 or 691, or computer system 670 or 671. Any of these systems also may include two or more processing devices such as represented in FIG. 8, which may be coupled to each other via a network or multiple networks.

In the illustrated embodiment, the processing system 800 includes one or more processors 810, memory 811, a communication device 812, and one or more input/output (I/O) devices 813, all coupled to each other through an interconnect 814. The interconnect 814 may be or include one or more conductive traces, buses, point-to-point connections, controllers, adapters and/or other conventional connection devices. The processor(s) 810 may be or include, for example, one or more general-purpose programmable microprocessors, microcontrollers, application specific integrated circuits (ASICs), programmable gate arrays, or the like, or a combination of such devices. The processor(s) 810 control the overall operation of the processing device 800. Memory 811 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 811 may store data and instructions that configure the processor(s) 810 to execute operations in accordance with the techniques described above. The communication device 812 may be or may include, for example, an Ethernet adapter, cable modem, Wi-Fi adapter, cellular transceiver, Bluetooth transceiver, or the like, or a combination thereof. Depending on the specific nature and purpose of the processing device 800, the I/O devices 813 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A system comprising:
   one or more processors; and
   a computer-readable media storing instructions which, when executed by the one or more processors, cause the one or more processors to perform operations including:
   receiving, by the one or more processors, transaction information associated with financial transactions between a plurality of card users and a payee, the transaction information including transaction card information from a plurality of read events of a plurality of transaction cards by a card reader associated with the payee;
   in association with the plurality of read events, receiving, by the one or more processors, location information of a plurality of mobile devices, each of the mobile devices being associated respectively with one of the plurality of transaction cards in a data structure maintained by the computer system, the location information for each mobile device being indicative of a location of the mobile device at a time of a corresponding read event of an associated transaction card; and
   determining, by the one or more processors, from the location information of the plurality of mobile devices, an approximate location of the card reader based on a subset of locations of the mobile devices that are within a determined distance of each other;
   receiving, by the one or more processors, first mobile device location information indicative of a first location of a first mobile device associated with a card user at a time corresponding to a read event at which a first transaction card associated with the card user is read by the card reader;
   determining, by the one or more processors, a proximity between the first mobile device and the card reader based on the first mobile device location information and the approximate location of the card reader; and
   sending, by the one or more processors, a communication to a point-of-sale (POS) system associated with the card reader to cause the POS system to execute a selected checkout flow based on the proximity.

2. The system as recited in claim 1, wherein the selected checkout flow includes using a reduced level of fraud screening based on the proximity being indicative of the first mobile device being located at substantially the same location as the card reader, in relation to a level of fraud screening used when the proximity is indicative of the first mobile device being located at a different location than the card reader.

3. The system as recited in claim 1, the operations further comprising maintaining, by the computer system, in the data structure, a stored association between respective payment cards of respective users and contact information for respective mobile devices of the respective users.

4. The system as recited in claim 3, the operations further comprising:
   in response to receiving the transaction information including the transaction card information for a respective read event, accessing the data structure to determine the contact information for the respective mobile device associated with the card information in the data structure; and
   sending a message to the respective mobile device to request geographic location information for the respective mobile device corresponding to the read event.

5. The system as recited in claim 1, the operations further comprising sending a photograph of a user associated with the transaction card based at least on the determined proximity between the first mobile device and the card reader.

6. The system as recited in claim 1, wherein the selected checkout flow includes a level of fraud screening that is higher when the proximity is indicative of the mobile device being located at a place other than a place of business of the payee, in relation to a level of fraud screening used when the proximity is indicative of the mobile device being located at the place of business of the payee.

7. A method comprising:
   receiving, by a computer system, transaction information associated with financial transactions between a plurality of card users and a payee, the transaction information including transaction card information from a plurality of read events of a plurality of transaction cards by a card reader associated with the payee;
   in association with the plurality of read events, receiving, by the computer system, location information of a plurality of mobile devices, each of the mobile devices being associated respectively with one of the plurality of transaction cards in a data structure maintained by the computer system, the location information for each mobile device being indicative of a location of the mobile device at a time of a corresponding read event of an associated transaction card;
   determining, by the computer system, from the location information of the plurality of mobile devices, an approximate location of the card reader based on a subset of locations of the mobile devices that are within a determined distance of each other;
   receiving, by the computer system, first mobile device location information indicative of a first location of a first mobile device associated with a card user at a time corresponding to a read event at which a first transaction card associated with the card user is read by the card reader;
   determining, by the computer system, a proximity between the first mobile device and the card reader based on the first mobile device location information and the approximate location of the card reader; and
   sending, by the computer system, a communication to a point-of-sale (POS) system associated with the card reader to cause the POS system to execute a selected checkout flow based on the proximity.

8. The method as recited in claim 7, wherein the selected checkout flow includes using a reduced level of fraud screening based on the proximity being indicative of the first mobile device being located at substantially the same location as the card reader, in relation to a level of fraud screening used when the proximity is indicative of the first mobile device being located at a different location than the card reader.

9. The method as recited in claim 7, further comprising maintaining, by the computer system, in the data structure, a stored association between respective payment cards of respective users and contact information for respective mobile devices of the respective users.

10. The method as recited in claim 9, further comprising:
in response to receiving the transaction information including the transaction card information for a respective read event, accessing the data structure to determine the contact information for the respective mobile device associated with the card information in the data structure; and
sending a message to the respective mobile device to request geographic location information for the respective mobile device corresponding to the read event.

11. The method as recited in claim 7, further comprising sending a photograph of a user associated with the transaction card based at least on the determined proximity between the first mobile device and the card reader.

12. The method as recited in claim 7, wherein the selected checkout flow includes a level of fraud screening that is higher when the proximity is indicative of the mobile device being located at a place other than a place of business of the payee, in relation to a level of fraud screening used when the proximity is indicative of the mobile device being located at the place of business of the payee.

13. A method comprising:
receiving, by a computer system, from a point-of-sale (POS) system, transaction information associated with financial transactions conducted by a plurality of card users using the POS system, the transaction information including transaction card information from a plurality of read events of a plurality of transaction cards by a card reader associated with the POS system;
in association with the plurality of read events, receiving, by the computer system, geographic location information of a plurality of mobile devices, each of the mobile devices being associated respectively with one of the plurality of transaction cards in a data structure maintained by the computer system, the geographic location information for each mobile device being indicative of a geographic location of the mobile device at a time of a corresponding read event of an associated transaction card by the card reader;
determining, by the computer system, from the geographic location information of the plurality of mobile devices, an approximate location of the card reader based on a subset of geographic locations of the mobile devices that are within a determined distance of each other;
comparing, by the computer system, the approximate location of the card reader with an indicated geographic location of a first mobile device in response to receiving an indication of a card read event of a transaction card associated with the first mobile device; and
sending, by the computer system, a communication to the POS system associated with the card reader to instruct the POS system to execute a selected checkout flow based on a result of the comparing.

14. The method as recited in claim 13, further comprising maintaining, by the computer system, in the data structure, a stored association between respective payment cards of respective users and contact information for respective mobile devices of the respective users.

15. The method as recited in claim 14, further comprising:
in response to receiving the transaction information including the transaction card information for a respective read event, accessing the data structure to determine the contact information for the respective mobile device associated with the card information in the data structure; and
sending a message to the respective mobile device to request geographic location information for the respective mobile device corresponding to the read event.

16. The method as recited in claim 13, wherein the selected checkout flow includes using a reduced level of fraud screening based on the proximity being indicative of the first mobile device being located at substantially the same location as the card reader, in relation to a level of fraud screening used when the proximity is indicative of the first mobile device being located at a different location than the card reader.

\* \* \* \* \*